United States Patent
Jang et al.

(10) Patent No.: US 11,706,845 B2
(45) Date of Patent: *Jul. 18, 2023

(54) END CELL HEATER FOR FUEL CELL

(71) Applicants: Hyundai Motor Company, Seoul (KR); Kia Motors Corporation, Seoul (KR); Hanon Systems, Daejeon (KR)

(72) Inventors: Kil Sang Jang, Daejeon (KR); Ju Han Kim, Gyeonggi-do (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 418 days.

This patent is subject to a terminal disclaimer.

(21) Appl. No.: 17/026,507

(22) Filed: Sep. 21, 2020

(65) Prior Publication Data

US 2021/0007185 A1 Jan. 7, 2021

Related U.S. Application Data

(62) Division of application No. 15/650,404, filed on Jul. 14, 2017, now Pat. No. 10,820,380.

(30) Foreign Application Priority Data

Jul. 15, 2016 (KR) .......................... 10-2016-0089794
Jun. 26, 2017 (KR) .......................... 10-2017-0080336

(51) Int. Cl.
*H05B 3/26* (2006.01)
*H01M 8/241* (2016.01)
(Continued)

(52) U.S. Cl.
CPC ............ *H05B 3/26* (2013.01); *H01M 8/0297* (2013.01); *H01M 8/04037* (2013.01);
(Continued)

(58) Field of Classification Search
CPC .. H05B 3/26; H01M 8/0297; H01M 8/04037; H01M 8/04074; H01M 8/241; H01M 8/04268; H01M 8/04253
(Continued)

(56) References Cited

U.S. PATENT DOCUMENTS 4,292,379 A * 9/1981 Kothmann .......... H01M 8/0265
429/513
5,063,123 A * 11/1991 Ohsuga ............... H01M 8/0213
429/456
(Continued)

FOREIGN PATENT DOCUMENTS

JP 2007283677 A 11/2007
JP 2008-269878 A 11/2008
(Continued)

*Primary Examiner* — Jimmy Chou
(74) *Attorney, Agent, or Firm* — Fox Rothschild LLP

(57) ABSTRACT

Provided is an end cell heater for a fuel cell capable of preventing water existing in reaction cells of a fuel cell stack from being frozen to improve initial start ability and initial driving performance of the fuel cell at the time of cold-starting the fuel cell during winter by disposing heaters on end cells disposed at both ends of the fuel cell stack and capable of securing air-tightness and pressure resistance properties of air passages and fuel passages formed in the end cell.

12 Claims, 14 Drawing Sheets

(51) Int. Cl.
*H01M 8/04223* (2016.01)
*H01M 8/0297* (2016.01)
*H01M 8/04007* (2016.01)

(52) U.S. Cl.
CPC ... *H01M 8/04074* (2013.01); *H01M 8/04253* (2013.01); *H01M 8/241* (2013.01); *H01M 8/04268* (2013.01)

(58) Field of Classification Search
USPC .................................................. 219/209
See application file for complete search history.

(56) References Cited

U.S. PATENT DOCUMENTS

| | | | | | |
|---|---|---|---|---|---|
| 5,252,410 | A * | 10/1993 | Wilkinson | ......... | H01M 8/0258 429/513 |
| 6,686,080 | B2 * | 2/2004 | Farkash | ............. | H01M 8/0267 429/434 |
| 6,933,570 | B2 * | 8/2005 | Morimoto | ........... | H01M 8/1007 257/350 |
| 6,989,215 | B1 * | 1/2006 | McLean | .............. | H01M 8/0271 429/535 |
| 8,076,017 | B2 * | 12/2011 | Matsumoto | ........... | H01M 8/248 429/469 |
| 8,173,320 | B2 * | 5/2012 | Takata | ................... | H01M 8/241 429/510 |
| 8,450,027 | B2 * | 5/2013 | Kim | ...................... | H01M 8/248 429/507 |
| 8,465,864 | B1 * | 6/2013 | Kwak | ................ | H01M 10/6551 429/129 |
| 8,535,842 | B2 * | 9/2013 | Thompson | ........ | H01M 8/04268 429/408 |
| 8,785,063 | B2 * | 7/2014 | Yang | ................... | H01M 8/2465 429/414 |
| 8,877,398 | B2 * | 11/2014 | Lee | ...................... | H01M 8/242 429/514 |
| 8,907,208 | B2 * | 12/2014 | Song | ................... | H01L 51/445 136/263 |
| 9,074,982 | B2 * | 7/2015 | Ramirez | ............... | G01N 27/02 |
| 9,172,096 | B2 * | 10/2015 | Suh | ..................... | H01M 8/0221 |
| 9,252,437 | B2 * | 2/2016 | Yang | ................ | H01M 8/2483 |
| 9,425,477 | B2 * | 8/2016 | Kim | .................... | H01M 8/2475 |
| 9,502,722 | B2 * | 11/2016 | Lee | .................... | H01M 8/04074 |
| 10,033,061 | B2 * | 7/2018 | Heo | ...................... | H01M 8/248 |
| 10,090,543 | B2 * | 10/2018 | Kim | .................. | H01M 8/04291 |
| 10,090,551 | B2 * | 10/2018 | Suh | ..................... | H01M 8/248 |
| 10,122,032 | B2 * | 11/2018 | Ko | ........................ | B60L 58/32 |
| 10,161,526 | B2 * | 12/2018 | Na | .................... | H01M 8/04768 |
| 10,205,183 | B2 * | 2/2019 | Kim | .................. | H01M 8/04231 |
| 10,243,223 | B2 * | 3/2019 | Kwon | ................ | H01M 8/04067 |
| 10,283,755 | B2 * | 5/2019 | Lim | .................... | H01M 10/6557 |
| 10,448,545 | B2 * | 10/2019 | Lim | ..................... | H01M 10/625 |
| 10,468,696 | B2 * | 11/2019 | Gu | ..................... | H01M 8/2483 |
| 2002/0071984 | A1 * | 6/2002 | Dristy | ................. | H01M 8/0228 429/66 |
| 2002/0172852 | A1 * | 11/2002 | Frank | ................. | H01M 8/0267 429/514 |
| 2002/0187386 | A1 * | 12/2002 | Sugiura | ............... | H01M 8/0254 429/470 |
| 2003/0022046 | A1 * | 1/2003 | Hayashi | .............. | H01M 8/0228 429/435 |
| 2003/0031914 | A1 * | 2/2003 | Frank | ................. | H01M 8/0267 29/623.2 |
| 2003/0031920 | A1 | 2/2003 | Hoffman et al. | | |
| 2003/0044657 | A1 * | 3/2003 | Hayashi | ............. | H01M 8/241 429/461 |
| 2003/0072988 | A1 * | 4/2003 | Frisch | ................. | H01M 8/0271 429/469 |
| 2003/0221819 | A1 * | 12/2003 | Jang | ..................... | F28F 9/0214 165/173 |
| 2003/0235733 | A1 * | 12/2003 | Haltiner, Jr. | ........ | H01M 8/1246 429/434 |
| 2004/0025784 | A1 * | 2/2004 | Kawamura | ........ | H01M 8/04074 117/200 |
| 2004/0086768 | A1 * | 5/2004 | Fleckner | ............. | H01M 8/1004 429/514 |
| 2004/0089438 | A1 * | 5/2004 | Valensa | ................ | H01M 8/0631 165/4 |
| 2004/0101728 | A1 * | 5/2004 | Enjoji | ................... | H01M 8/242 429/436 |
| 2004/0115500 | A1 * | 6/2004 | Ogami | ................ | H01M 8/2483 429/492 |
| 2004/0157105 | A1 * | 8/2004 | Ovshinsky | ........... | H01M 8/247 429/469 |
| 2004/0175606 | A1 * | 9/2004 | Komura | .............. | H01M 8/2418 429/456 |
| 2004/0247967 | A1 * | 12/2004 | Resnick | ........... | H01M 8/04291 429/441 |
| 2005/0037247 | A1 * | 2/2005 | Takahashi | ......... | H01M 8/04225 429/444 |
| 2005/0058865 | A1 * | 3/2005 | Thompson | ........ | H01M 8/04268 429/432 |
| 2005/0084732 | A1 * | 4/2005 | Breault | ................ | H01M 8/241 429/522 |
| 2005/0095492 | A1 * | 5/2005 | Frank | .................. | H01M 8/0271 429/480 |
| 2005/0147870 | A1 * | 7/2005 | Nakanishi | ............ | H01M 8/023 429/444 |
| 2005/0186464 | A1 * | 8/2005 | Sugiura | ............... | H01M 8/0234 429/534 |
| 2005/0233193 | A1 * | 10/2005 | Holler | ................. | H01M 8/0263 429/465 |
| 2005/0277012 | A1 * | 12/2005 | Inagaki | ............... | H01M 8/247 429/511 |
| 2006/0046130 | A1 * | 3/2006 | Lai | ...................... | H01M 8/0267 429/457 |
| 2006/0068235 | A1 * | 3/2006 | Resnick | ........... | H01M 8/04253 429/434 |
| 2006/0110649 | A1 * | 5/2006 | Nishiyama | .......... | H01M 8/0263 429/457 |
| 2006/0204806 | A1 * | 9/2006 | Takada | ................ | H01M 8/0267 429/457 |
| 2006/0222924 | A1 * | 10/2006 | Matsuoka | ........... | H01M 8/2457 429/432 |
| 2006/0240300 | A1 * | 10/2006 | Thompson | ........ | H01M 8/04022 429/441 |
| 2006/0263664 | A1 * | 11/2006 | Fowler | ............... | H01M 8/0267 429/457 |
| 2007/0026288 | A1 * | 2/2007 | Friedman | ............ | H01M 8/2457 429/514 |
| 2007/0111089 | A1 * | 5/2007 | Swan | ................... | H01M 50/536 429/162 |
| 2007/0148503 | A1 * | 6/2007 | Okazaki | ............. | H01M 8/2475 429/492 |
| 2007/0184329 | A1 * | 8/2007 | Kim | .................... | H01M 4/8605 429/513 |
| 2007/0212587 | A1 * | 9/2007 | Fragiadakis | ........ | H01M 8/2483 429/513 |
| 2007/0231664 | A1 * | 10/2007 | Zerfass | ................ | H01M 8/247 429/510 |
| 2007/0231666 | A1 * | 10/2007 | Wang | ................. | H01M 8/0206 429/514 |
| 2007/0238004 | A1 * | 10/2007 | Osenar | ............... | H01M 8/0297 429/510 |
| 2007/0287047 | A1 * | 12/2007 | Kaiser | ................ | H01M 8/0267 29/730 |
| 2008/0044712 | A1 * | 2/2008 | Ko | ...................... | H01M 8/04052 429/522 |
| 2008/0050627 | A1 * | 2/2008 | Winter | ................ | H01M 4/0407 429/513 |
| 2008/0050629 | A1 * | 2/2008 | Lin | ..................... | H01M 8/0228 429/457 |
| 2008/0090129 | A1 * | 4/2008 | Kunz | ..................... | H01M 8/086 429/510 |
| 2008/0118812 | A1 * | 5/2008 | Kawakami | .......... | H01M 8/0271 429/469 |
| 2008/0138670 | A1 * | 6/2008 | Johnston | ............. | H01M 8/0267 429/492 |

(56) References Cited

U.S. PATENT DOCUMENTS

| | | | |
|---|---|---|---|
| 2008/0152990 A1* | 6/2008 | Ibuka | H01M 8/025 429/510 |
| 2008/0182150 A1* | 7/2008 | De Haan | H01M 4/8896 429/510 |
| 2009/0042075 A1* | 2/2009 | Nakanishi | H01M 8/241 429/480 |
| 2009/0053571 A1* | 2/2009 | Takata | H01M 8/241 429/457 |
| 2009/0068518 A1* | 3/2009 | Kang | H01M 8/04074 429/423 |
| 2009/0148746 A1* | 6/2009 | Kato | H01M 8/1004 429/412 |
| 2009/0162711 A1* | 6/2009 | Fujita | H01M 8/04559 429/402 |
| 2009/0226781 A1* | 9/2009 | Devoe | H01M 8/2435 977/720 |
| 2009/0233147 A1* | 9/2009 | Yoshizawa | H01M 8/0232 429/456 |
| 2009/0305104 A1* | 12/2009 | Matsumoto | H01M 8/0267 429/434 |
| 2009/0311574 A1* | 12/2009 | Lee | H01M 8/04253 429/479 |
| 2010/0035110 A1* | 2/2010 | Lundblad | H01M 8/028 429/469 |
| 2010/0055533 A1* | 3/2010 | Kebbede | H01M 8/0297 429/465 |
| 2010/0119907 A1* | 5/2010 | Shibata | H01M 8/2475 429/432 |
| 2010/0124683 A1* | 5/2010 | Carlstrom, Jr. | H01M 8/04074 429/433 |
| 2010/0297525 A1* | 11/2010 | Fukuta | H01M 8/026 429/535 |
| 2010/0310962 A1* | 12/2010 | Chen | H01M 8/0258 429/457 |
| 2010/0316916 A1* | 12/2010 | Takeguchi | H01M 8/04007 429/430 |
| 2011/0229783 A1* | 9/2011 | Robb | H01M 8/04582 429/432 |
| 2011/0244342 A1* | 10/2011 | An | H01M 8/2483 429/413 |
| 2011/0287332 A1* | 11/2011 | Connor | H01M 8/04014 429/434 |
| 2012/0028156 A1* | 2/2012 | Song | H01M 8/04007 429/437 |
| 2012/0058411 A1* | 3/2012 | Kobayashi | H01M 8/2465 429/465 |
| 2012/0077105 A1* | 3/2012 | Lee | H01M 8/242 429/512 |
| 2012/0100450 A1* | 4/2012 | Lee | H01M 8/241 429/436 |
| 2013/0164646 A1* | 6/2013 | Kobayashi | H01M 8/0267 429/434 |
| 2013/0177832 A1* | 7/2013 | Tsubosaka | H01M 8/1004 429/480 |
| 2014/0106254 A1* | 4/2014 | Yamano | H01M 8/2465 429/465 |
| 2014/0127599 A1* | 5/2014 | Kachi | H01M 8/1246 429/434 |
| 2014/0162162 A1* | 6/2014 | Kalika | H01M 8/2475 429/456 |
| 2014/0295308 A1* | 10/2014 | Tsuga | H01M 8/04074 429/435 |
| 2014/0356749 A1* | 12/2014 | Yang | H01M 8/2465 429/437 |
| 2015/0090427 A1* | 4/2015 | Brandauer | H01M 10/6571 165/64 |
| 2015/0255810 A1* | 9/2015 | Kells | H01M 8/04768 429/434 |
| 2015/0333346 A1* | 11/2015 | Asano | H01M 8/04074 429/436 |
| 2016/0056492 A1* | 2/2016 | Tsuga | H01M 8/0267 429/458 |
| 2016/0097137 A1* | 4/2016 | Tsukuda | C25B 9/19 429/465 |
| 2016/0118672 A1* | 4/2016 | Shizuku | H01M 8/0228 429/520 |
| 2016/0141643 A1* | 5/2016 | Fukuyama | H01M 8/2404 429/468 |
| 2016/0359175 A1* | 12/2016 | Okuyama | H01M 8/0206 |
| 2016/0380298 A1* | 12/2016 | Leah | H01M 8/2432 429/465 |
| 2017/0194674 A1* | 7/2017 | Lee | H01M 10/486 |
| 2017/0352900 A1* | 12/2017 | Kim | H01M 8/2475 |
| 2018/0019484 A1* | 1/2018 | Cerceau | H01M 8/04074 |
| 2018/0040907 A1* | 2/2018 | Ishida | H01M 8/247 |
| 2018/0254497 A1* | 9/2018 | Verdier | H01M 8/04738 |
| 2019/0044163 A1* | 2/2019 | Romet | H01M 8/04268 |

FOREIGN PATENT DOCUMENTS

| | | |
|---|---|---|
| JP | 2013206855 A | 10/2013 |
| JP | 2014049383 A | 3/2014 |
| KR | 101466507 B1 | 11/2014 |

* cited by examiner

END CELL HEATER FOR FUEL CELL

CROSS-REFERENCE TO RELATED APPLICATIONS

This application is a Divisional application of U.S. application Ser. No. 15/650,404 filed Jul. 14, 2017, which claims priority under 35 U.S.C. § 119 to Korean Patent Application No. 10-2016-0089794, filed on Jul. 15, 2016, in the Korean Intellectual Property Office, the disclosure of which is incorporated herein by reference in its entirety.

TECHNICAL FIELD

The following disclosure relates to an end cell heater for a fuel cell. More particularly, the following disclosure relates to an end cell heater for a fuel cell capable of preventing water existing in reaction cells of a fuel cell stack from being frozen to improve initial start ability and initial driving performance of the fuel cell at the time of cold-starting the fuel cell during winter by disposing heaters on end cells disposed at both ends of the fuel cell stack.

BACKGROUND

Generally, a fuel cell, which is a power generation device converting chemical energy by oxidation and reduction of hydrogen into electric energy, discharges only water ($H_2O$) as a byproduct, does not substantially generate NOx, SOx, and dust, generates a low amount of $CO_2$, and does not substantially generate noise unlike existing other chemical energy. Therefore, the fuel cell has been prominent as the next-generation alternative energy.

The fuel cell includes unit cells basically including an electrolyte plate containing an electrolyte, an anode, a cathode, and a separator separating the electrolyte plate containing the electrolyte, the anode, and the cathode from one another. However, since the unit cell generally generates a low voltage of 0.6 to 0.8V, a fuel cell stack 1 in which several tens or several hundreds of unit cells 30 are stacked is configured to obtain a desired electric output, as illustrated in FIG. 1. In addition, a membrane-electrode assembly (MEA) is configured by forming the electrolyte plate containing the electrolyte, the anode, and the cathode integrally with one another, and patterns are formed in the separator separating the electrolyte plate containing the electrolyte, the anode, and the cathode from one another to allow a fuel and air to flow.

In addition, various fuels such as natural gas, petroleum, coal gas, methanol, and the like, may be used in the fuel cell, and are converted into hydrogen through a fuel reforming device and are used.

However, in the fuel cell configured in a form of the fuel cell stack as described above, water generated by bond between oxygen and hydrogen in unit cells (end cells) positioned at the outermost portions in a stack direction of the unit cells remains, and is frozen in the end cells due to a cold external temperature during winter. Therefore, electricity is not generated in the end cells, such that initial start ability and oscillation ability of the fuel cell are deteriorated.

RELATED ART DOCUMENT

Patent Document

KR 10-1466507 B1 (2014 Nov. 21)

SUMMARY

An embodiment of the present invention is directed to providing an end cell heater for a fuel cell capable of preventing water existing in reaction cells of a fuel cell stack from being frozen by disposing heaters on end cells disposed at both ends of the fuel cell stack.

An embodiment of the present invention is also directed to providing an end cell heater capable of securing air-tightness and a pressure resistance property of an air passage and a fuel passage formed in an end cell.

In one general aspect, an end cell heater 1000 for a fuel cell includes: an end cell 100 including a body 110 and an upper cover 120 stacked on and in contact with an upper surface of the body 110, and having air channels 111 formed between the body 110 and the upper cover 120; a heating element 200 stacked on and coupled to the end cell 100; and an electricity collecting plate 300 stacked on and in contact with the heating element 200.

Fusing protrusions may be formed to protrude on any one or more of the upper surface of the body 110 and a lower surface of the upper cover 120, fusing grooves may be concavely formed at both sides of the fusing protrusions so as to be in contact with the fusing protrusions, and the fusing protrusions may be melted, such that the body 110 and the upper cover 120 are bonded to each other.

The fusing protrusions and the fusing grooves may be formed at both sides of the air channels 111 so as to be spaced apart from the air channels 111.

In the end cell 100, fusing protrusions may be melted by vibration fusion or laser fusion, such that the body 110 and the upper cover 120 are bonded to and formed integrally with each other.

A seating groove may be concavely formed in a lower surface of the body 110, and the electricity collecting plate 300 may be stacked on a lower surface of the heating element 200 so as to be in contact with the lower surface of the heating element 200, such that the heating element 200 and the electricity collecting plate 300 are inserted into and seated in the seating groove.

In another general aspect, an end cell heater 1000 for a fuel cell includes: an end cell 100 including a body 110, an upper cover 120 stacked on and in contact with an upper surface of the body 110, and a lower cover 130 stacked on and in contact with a lower surface of the body 110, having air channels 111 formed between the body 110 and the upper cover 120, and having fuel channels 112 formed between the body 110 and the lower cover 130; a heating element 200 stacked on and coupled to the end cell 100; and an electricity collecting plate 300 stacked on and in contact with the heating element 200.

Fusing protrusions may be formed to protrude on any one or more of the upper surface of the body 110 and a lower surface of the upper cover 120, fusing grooves may be concavely formed at both sides of the fusing protrusions so as to be in contact with the fusing protrusions, and the fusing protrusions may be melted, such that the body 110 and the upper cover 120 are bonded to each other, and fusing protrusions may be formed to protrude on any one or more of the lower surface of the body 110 and an upper surface of the lower cover 130, fusing grooves may be concavely formed at both sides of the fusing protrusions so as to be in contact with the fusing protrusions, and the fusing protrusions may be melted, such that the body 110 and the lower cover 130 are bonded to each other.

The fusing protrusions and the fusing grooves may be formed at both sides of each of the air channels 111 and the fuel channels 112 so as to be spaced apart from the air channels 111 and the fuel channels 112.

In the end cell 100, fusing protrusions may be melted by vibration fusion or laser fusion, such that the body 110 and the upper cover 120 are bonded to each other and the body 110 and the lower cover 130 are bonded to each other, and the body 110, the upper cover 120, and the lower cover 130 are thus formed integrally with one another.

A seating groove may be concavely formed in a lower surface of the lower cover 130, and the electricity collecting plate 300 may be stacked on a lower surface of the heating element 200 so as to be in contact with the lower surface of the heating element 200, such that the heating element 200 and the electricity collecting plate 300 are inserted into and seated in the seating groove.

A cross-sectional area of a portion in which a fusing protrusion is melted may be smaller than that of a pair of fusing grooves formed at both sides of each fusing protrusion.

Protruding parts 115 may be formed to protrude on the upper surface of the body 110, fusing protrusions 113 may be formed to protrude on upper surfaces of the protruding parts 115, and insertion grooves 121 may be concavely formed at positions corresponding to those of the protruding parts 115 in the upper cover 120, such that the protruding parts 115 and the fusing protrusions 113 are inserted into the insertion grooves 121 and the fusing protrusions 113 are melted to be fused to the insertion grooves 121.

A height of the insertion groove 121 may be higher than that of the protruding part 115, and a cross-sectional area of a space between the protruding part 115 and the insertion groove 121 may be greater than that of a portion in which the fusing protrusion 113 is melted.

A lead terminal 140 in which terminals 141 and injection-molded members 142 are formed integrally with each other by insert-injection-molding the terminals 141 may be again insert-injection-molded, such that the body 110 and the lead terminal 140 are formed integrally with each other.

The end cell heater for a fuel cell may further include: an end plate 600 stacked on the upper cover 120; and a gasket 500 interposed between and closely adhering to the upper cover 120 and the end plate 600.

The gasket 500 may include sealing members 530 formed to protrude on both surfaces of a plate 510 and a plurality of communication holes 520 formed in the plate 510 so as to penetrate through upper and lower surfaces of the plate 510, and the sealing members 530 formed on the upper and lower surfaces of the plate 510 may be connected to each other through the communication holes 520.

In the gasket 500, the plate 510 and the sealing members 530 may be formed integrally with each other by insert-injection-molding.

DETAILED DESCRIPTION OF MAIN ELEMENTS

| | |
|---|---|
| 1000: end cell heater for fuel cell | |
| 100: end cell | |
| 110: body | |
| 111: air channel | 112: fuel channel |
| 113: fusing protrusion | 114: fusing groove |
| 115: protruding part | |
| 120: upper cover | 121: insertion groove |
| 130: lower cover | |
| 140: lead terminal | |
| 141: terminal | |
| 142: injection-molded member | |
| 151: air passage | 152: fuel passage |
| 200: heating element | |
| 300: electricity collecting plate | |
| 310: electricity collecting terminal | |
| 400: heat insulating sheet | |
| 500: gasket | |
| 510: plate | 520: communication hole |
| 530: sealing member | 531: sealing member |
| 540: passage hole | |
| 550: electricity collecting terminal hole | |
| 600: end plate | |
| 2000: fuel cell | |
| 1100: fuel cell stack | 1100a: reaction cell |
| 1110: air passage | 1120: fuel passage |
| 1400: cover | 1410: air passage |
| 1420: fuel passage | 1500: fastening member |

DETAILED DESCRIPTION OF EMBODIMENTS

Hereinafter, an end cell heater for a fuel cell according to the present invention having the configuration as described above will be described in detail with reference to the accompanying drawings.

First Exemplary Embodiment

Figure 1:
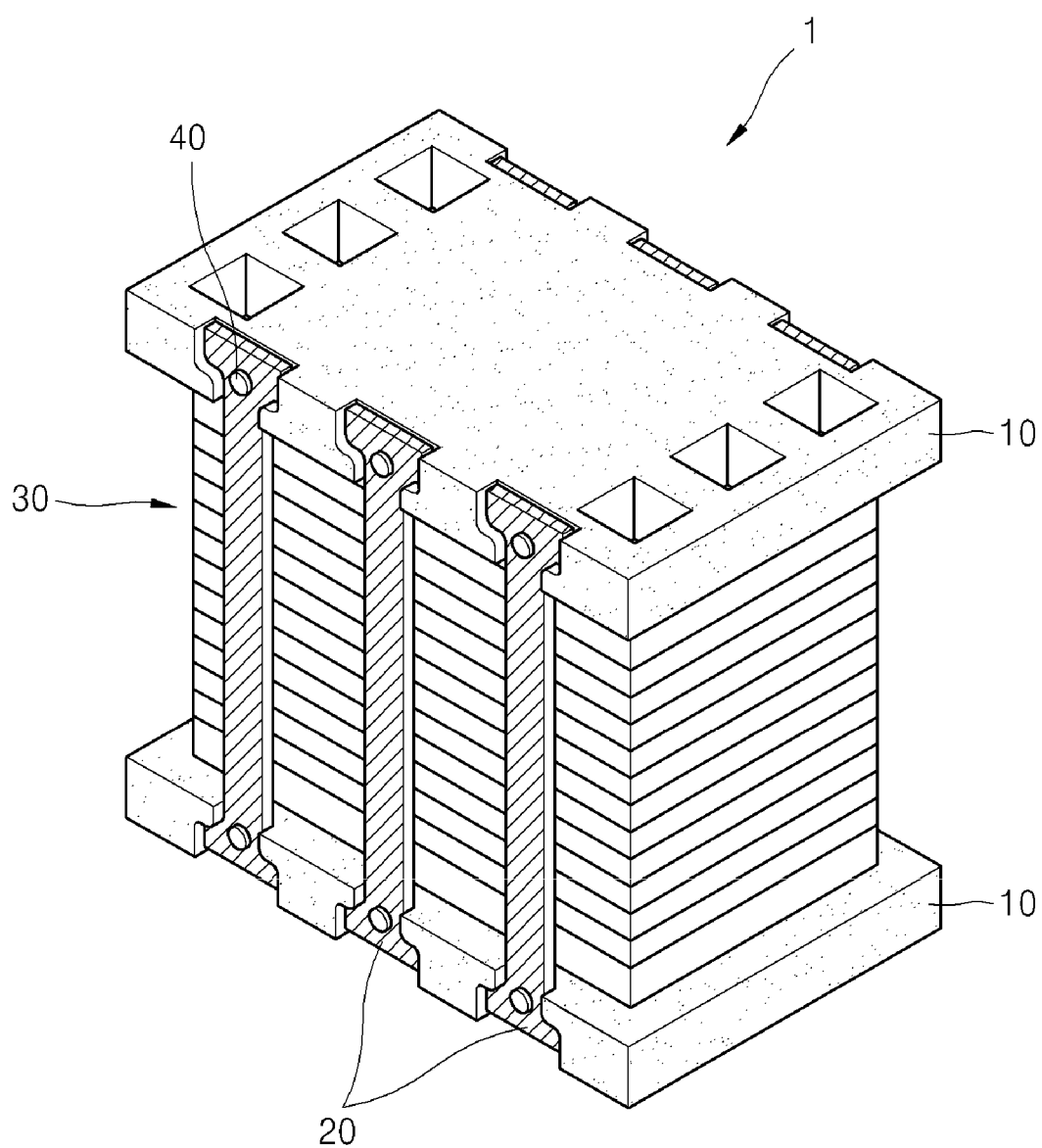
FIG. 1 is a perspective view illustrating a fuel cell according to the related art.
Figure 2:
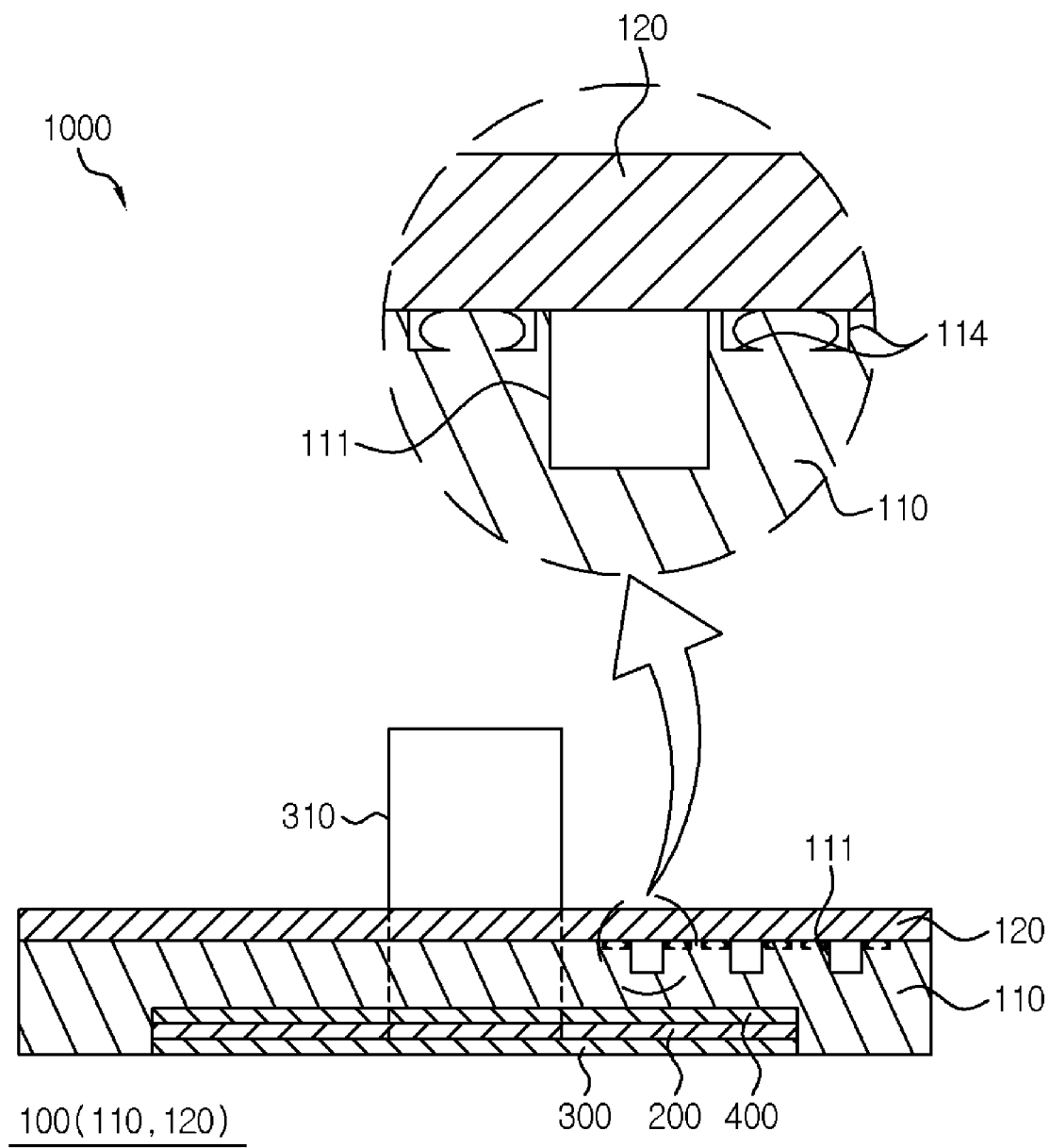
FIG. 2 is a cross-sectional view illustrating an end cell heater for a fuel cell according to a first exemplary embodiment of the present invention.

FIG. 2 is a cross-sectional view illustrating an end cell heater for a fuel cell according to a first exemplary embodiment of the present invention.

As illustrated, the end cell heater 1000 for a fuel cell according to a first exemplary embodiment of the present invention may be configured to include an end cell 100 including a body 110 and an upper cover 120 stacked on and in contact with an upper surface of the body 110, and having air channels 111 formed between the body 110 and the upper cover 120; a heating element 200 stacked on and coupled to the end cell 100; and an electricity collecting plate 300 stacked on and in contact with the heating element 200.

First, the end cell 100 may mainly consist of the body 110 and the upper cover 120, and both of the body 110 and the upper cover 120 may be formed of, for example, a plastic plate. In addition, the upper cover 120 is stacked on the upper surface of the body 110, such that the body 110 and the upper cover 120 may be coupled or bonded to each other so that surfaces thereof facing each other are in contact with each other. In addition, the air channels 111 are formed between the body 110 and the upper cover 120, such that air may flow along the air channels 111. In this case, the air channels 111 may be concavely formed in the upper surface of the body 110 or a lower surface of the upper cover 120. As an example, as illustrated, the air channels 111 may be concavely formed in the upper surface of the body 110, and opened upper sides of the air channels 111 may be closed by the upper cover 120 coupled or bonded to the upper surface of the body 110. In addition, the end cell 100 may be formed in various shapes such as a quadrangular shape having a length greater than a width, and the like, and may have air passages formed at both sides thereof in a length direction so as to penetrate through upper and lower surfaces thereof, and the air passages may be connected to the air channels. In addition, the end cell 100 may have a through-hole formed at a central side thereof so as to penetrate through the upper and lower surfaces thereof, and an electricity collecting terminal 310 formed on an electricity collecting plate 300 to be described below may be inserted into the through-hole so as to penetrate through the through-hole.

The heating element 200, which is a means capable of receiving electricity and generating heat, may be, for example, a film heater formed in a film shape, may be stacked on and coupled to the end cell 100, be inserted into and seated in a seating groove concavely formed in a lower surface of the body 110 of the end cell 100 as an example, and be coupled and fixed to the end cell 100. In addition, the heating element 200 may also have a through-hole formed therein so as to penetrate through upper and lower surfaces thereof so that the electricity collecting terminal 310 of the electricity collecting plate 300 may penetrate therethrough and be inserted thereinto. In addition, a heat insulating sheet 400 may be interposed between the end cell 100 and the heating element 200, may prevent heat generated from the heating element 200 from being transferred to the end cell 100 formed of a plastic material, and may be formed of an electrical insulating material to perform an electrical insulating function.

The electricity collecting plate 300, which is a part capable of collecting and transferring electricity generated in a fuel cell stack 1100, may be a metal plate formed of an electrically conductive material to be thus electrically conducted to the fuel cell stack. In addition, the electricity collecting plate 300 may be inserted into and seated in the seating groove formed in the body 110 of the end cell 100, and may be stacked to closely adhere to and be in contact with the lower surface of the heating element 200 to be thus coupled to the end cell 100. In addition, the electricity collecting terminal 310 may be formed to protrude on an upper surface of the electricity collecting plate 300, and may be inserted and coupled into the through-holes of the end cell 100 and the heating element 200 so as to pass through the through-holes.

Therefore, the end cell heater for a fuel cell according to the present invention as described above is stacked on and is coupled to an outer side of the outermost reaction cell of the fuel cell stack so as to closely adhere to the outer side of the outermost reaction cell to thus prevent water in the reaction cell from being frozen, thereby making it possible to improve initial start ability and initial driving performance of the fuel cell.

In addition, fusing protrusions are formed to protrude on any one or more of the upper surface of the body 110 and the lower surface of the upper cover 120, fusing grooves are concavely formed at both sides of the fusing protrusions so as to be in contact with the fusing protrusions, and the fusing protrusions are melted, such that the body 110 and the upper cover 120 may be bonded to each other.

Figure 3:
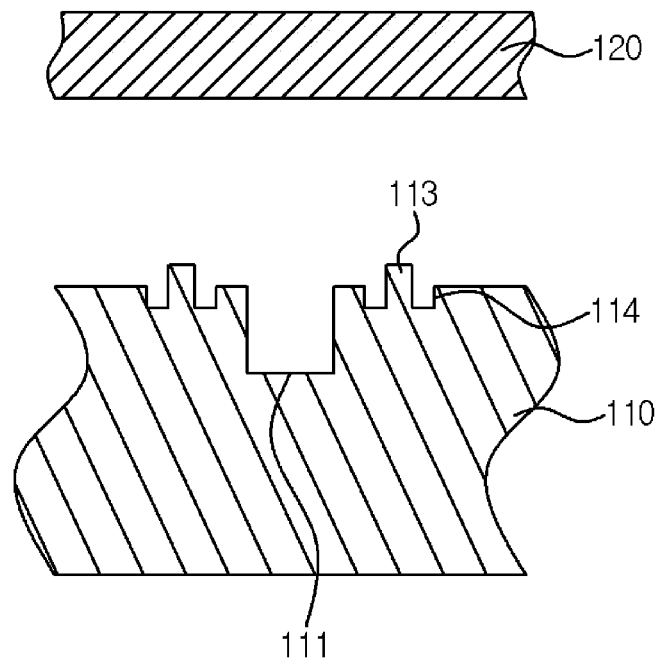
FIGS. 3 to 5 are partial cross-sectional views illustrating a fusing process of manufacturing an end cell heater according to the present invention.
Figure 4:
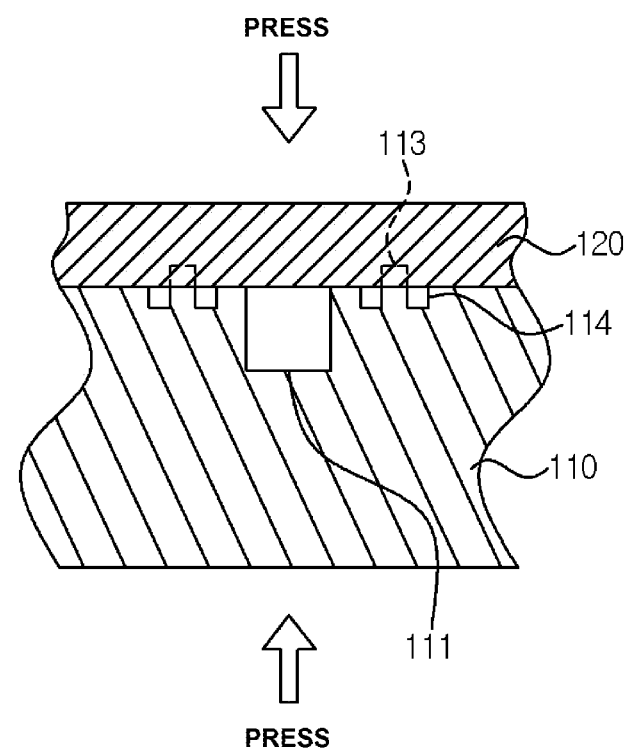
Figure 5:
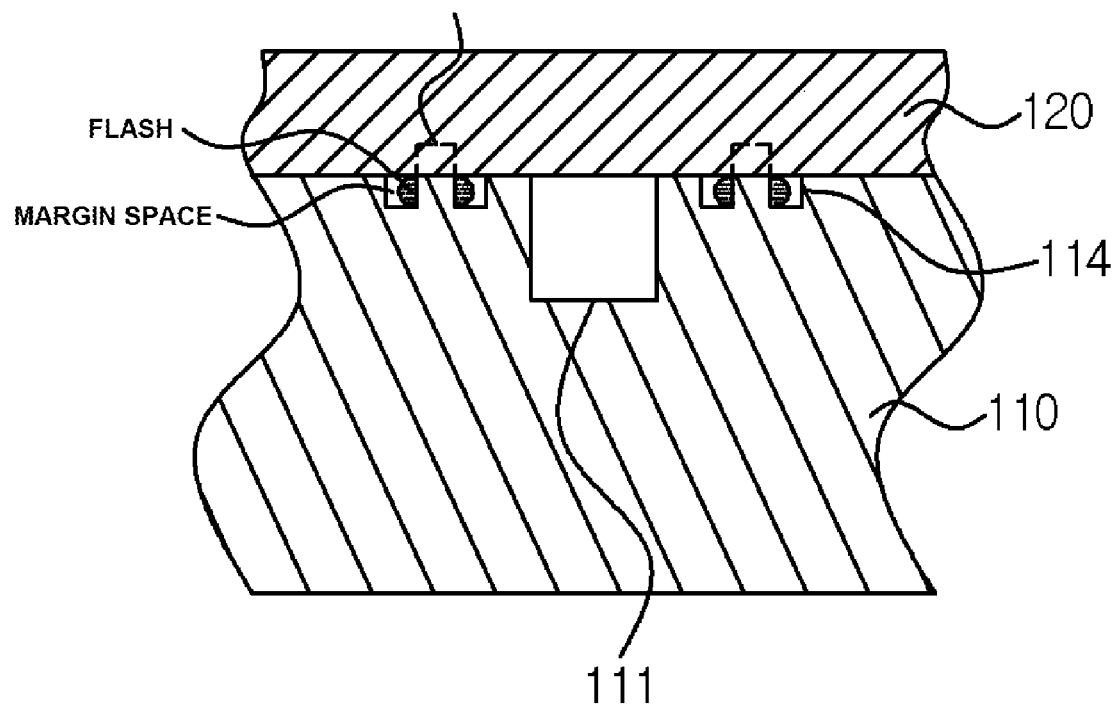

That is, as an example, as illustrated in FIGS. 3 to 5, the fusing protrusions 113 may be formed to protrude on the upper surface of the body 110, and the fusing grooves 114 may be concavely formed at both sides of the fusing protrusions 113 so as to be in contact with the fusing protrusions 113. A description will be provided on the basis of the fusing protrusions 113 and the fusing grooves 114 formed at an upper side of the body 110. The fusing protrusions 113 may be formed to protrude to be upwardly convex from the upper surface of the body 110, and the fusing grooves 114 may be formed adjacently to the fusing protrusions 113 at both sides of the fusing protrusions 113 so as to be downwardly concave from the upper surface of the body 110. In addition, the lower surface of the upper cover 120 may be a flat surface. Therefore, end portions of the fusing protrusions 113 are melted by fusion, such that the body 110 and the upper cover 120 may be bonded and coupled to each other, and a flash formed by melting and pressing the fusing protrusions 113 may be filled in the fusing grooves 114.

In addition, the fusing protrusions and the fusing grooves may be formed at both sides of the air channels 111 so as to be spaced apart from the air channels 111.

That is, the number of air channels 111 may be one or plural, the fusing protrusions 113 and the fusing grooves 114 may be formed along a path in which the air channels 111 are formed, and the fusing protrusions 113 and the fusing grooves 114 may be formed at both sides of the air channels 111 so as to be spaced apart from the air channels 111. Therefore, as illustrated, a pair of fusing protrusions 113 may be formed per air channel 111, one fusing protrusion 113 may be formed at each of both sides of one air channel 111, a pair of fusing grooves 114 may be formed per one fusing protrusion 113, and one fusing groove 114 may be formed at each of both sides of one fusing protrusion 113. In other words, protrusions and grooves of which one set is formed by the fusing grooves 114 formed at both sides of one fusing protrusion 113 may be formed at both sides of the channels, and one set of protrusions and grooves may be formed at both sides of each of the channels. Therefore, the fusing protrusions are melted along the channels, such that contact surfaces are bonded to each other, thereby making it possible to secure air-tightness of each of the channels and secure pressure resistance properties of fluids flowing along the channels.

In addition, in the end cell 100, the fusing protrusions are melted by vibration fusion or laser fusion, such that the body 110 and the upper cover 120 may be bonded to and formed integrally with each other.

That is, in a state in which the body 110 and the upper cover 120 are pressed in a vertical direction so as to closely adhere to each other after the upper cover 120 is disposed on the body 110 in a state in which the end portions of the fusing protrusions 113 are not melted, vibrations such as ultrasonic vibrations, or the like, are applied, such that heat is generated on a surface on which the fusing protrusions 113 and the upper cover 120 are in contact with each other to melt the fusing protrusions 113, thereby making it possible to bond the body 110 and the upper cover 120 to each other. In this case, the melted flash formed by melting the fusing protrusions 113 may be pushed into the fusing grooves 114. Therefore, the upper surface of the body 110 and the lower surface of the upper cover 120 may closely adhere and be bonded to each other, and the melted flash may not be introduced between the upper surface of the body 110 and the lower surface of the upper cover 120.

Alternatively, the body 110 is formed as an absorption layer capable of absorbing a laser beam, and the upper cover 120 is formed as a transmission layer through which the laser beam may transmit, such that the fusing protrusions 113 are melted and fused by the laser fusion, and the body 110 and the upper cover 120 may thus be formed integrally with each other.

That is, in the state in which the body 110 and the upper cover 120 are pressed in the vertical direction so as to closely adhere to each other after the upper cover 120 is disposed on the body 110 in the state in which the end portions of the fusing protrusions 113 are not melted, the laser beam is irradiated to portions of the fusing protrusions 113, thereby making it possible to bond portions at which the fusing protrusions 113 and the upper cover 120 are in contact with each other to each other while melting the fusing protrusions 113. Here, the body 110 on which the fusing protrusions 113 are formed is formed to have a black color so that the laser beam may be absorbed therein, such that the body 110 may be formed as a laser absorption layer, and the upper cover 120 is transparently formed so that the laser beam may pass therethrough, such that the upper cover 120 may be formed of a laser transmission layer. Therefore, the laser beam is irradiated from above the upper cover 120, and may pass through the upper cover 120 to allow the fusing protrusions 113 to be melted and fused. Also in this case, the melted flash formed by melting the fusing protrusions 113 may be pushed into the fusing grooves 114, and the upper surface of the body 110 and the lower surface of the upper cover 120 may thus closely adhere and be bonded to each other.

In addition, the seating groove is concavely formed in the lower surface of the body 110, and the electricity collecting plate 300 is stacked on the lower surface of the heating element 200 so as to be in contact with the lower surface of the heating element 200, such that the heating element 200 and the electricity collecting plate 300 may be inserted into and seated in the seating groove.

That is, as described above, the heating element 200 and the electricity collecting plate 300 may be inserted into and seated in the seating groove concavely formed in the lower surface of the body 110, and the electricity collecting plate 300 is disposed beneath the heating element 200 so as to be in contact with the heating element 200. In this case, the heat insulating sheet 400 may be interposed between a lower surface of the seating groove and the heating element 200, such that the heat insulating sheet 400 may be disposed on the heating element 200. In addition, a lower surface of the electricity collecting plate 300 may be formed to further protrude as compared with the lower surface of the body 110 of the end cell 100 or coincide with the lower surface of the body 110 of the end cell 100. Therefore, when the electricity collecting plate of the end cell heater for a fuel cell according to the present invention is coupled to the reaction cell of the fuel cell stack so as to closely adhere to the reaction cell, electrical insulation and air-tightness of the heating element 200 and the electricity collecting plate 300 may be easily maintained.

Second Exemplary Embodiment

Figure 6:
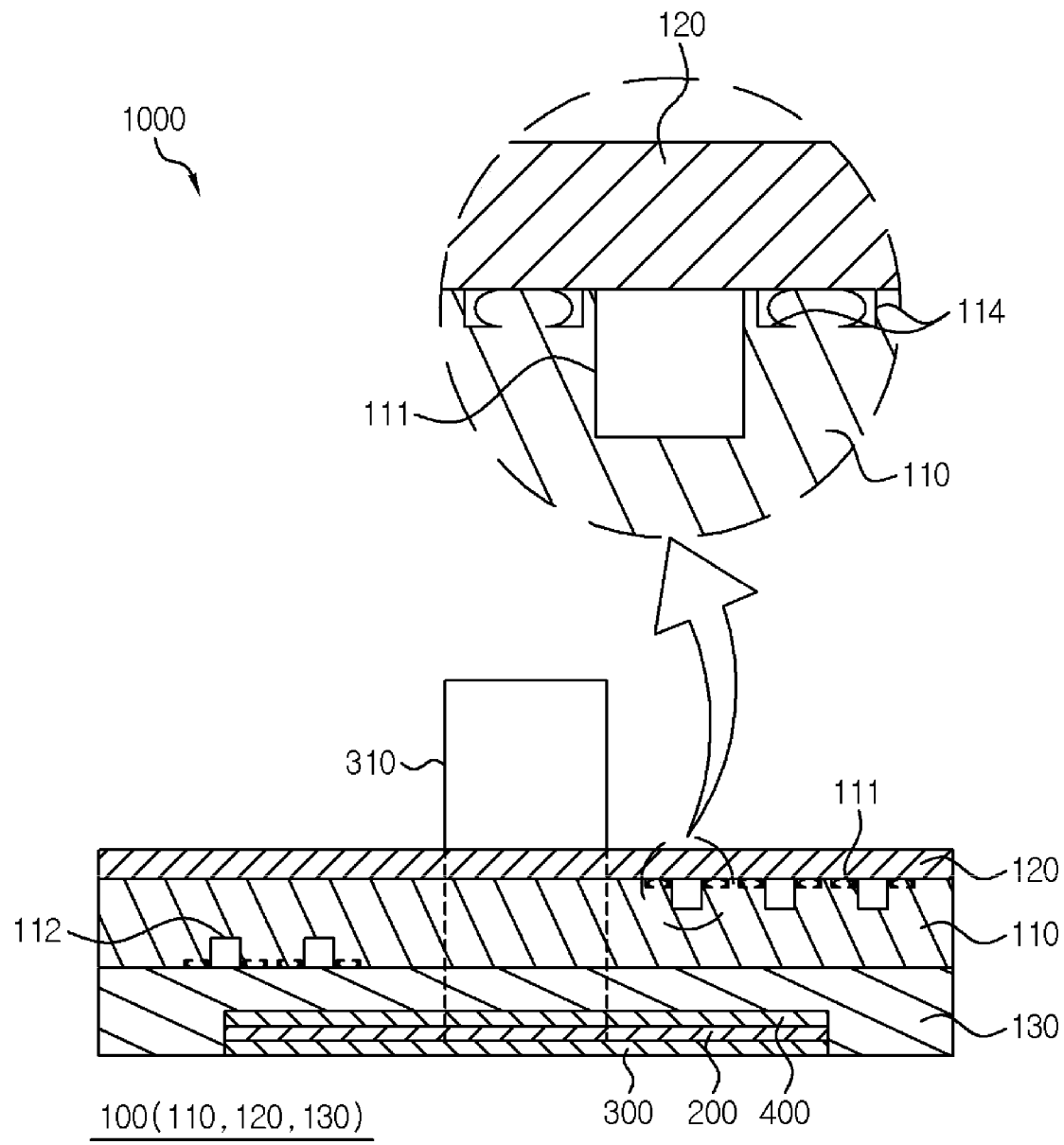
FIG. 6 is a cross-sectional view illustrating an end cell heater for a fuel cell according to a second exemplary embodiment of the present invention.
Figure 7:
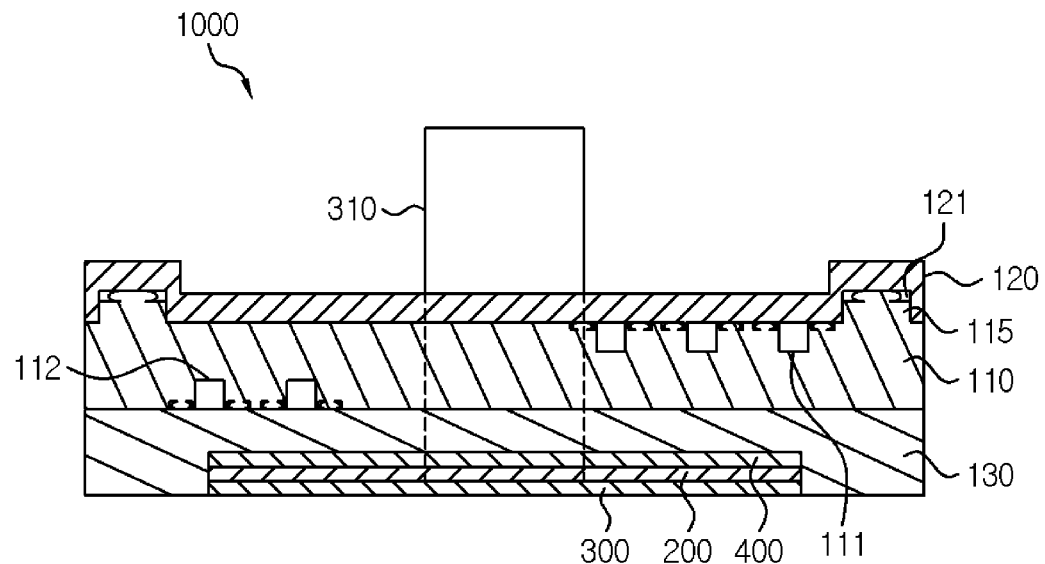
FIGS. 7 to 10 are a cross-sectional view and partial cross-sectional views illustrating various examples of an end cell heater for a fuel cell according to the present invention.
Figure 8:
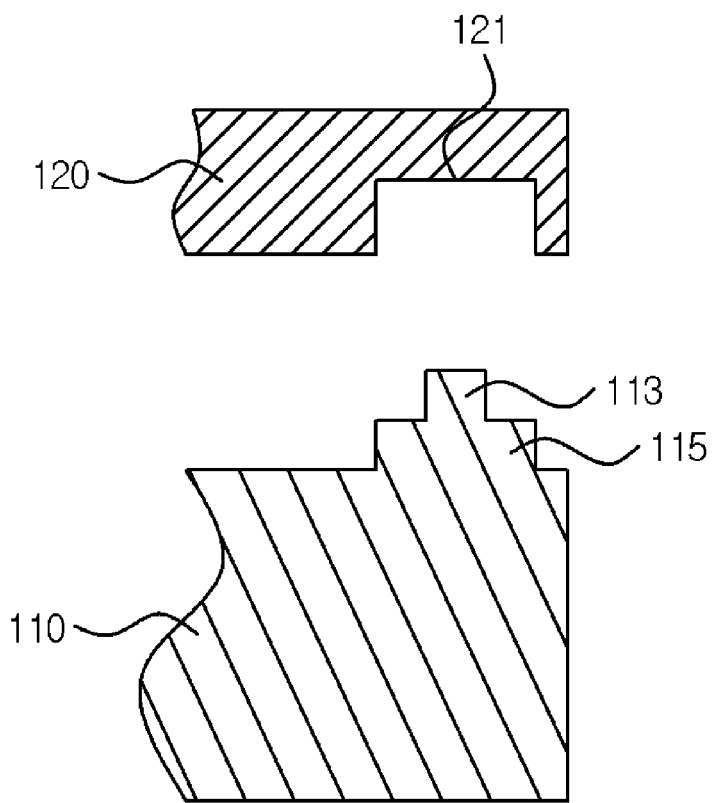
Figure 9:
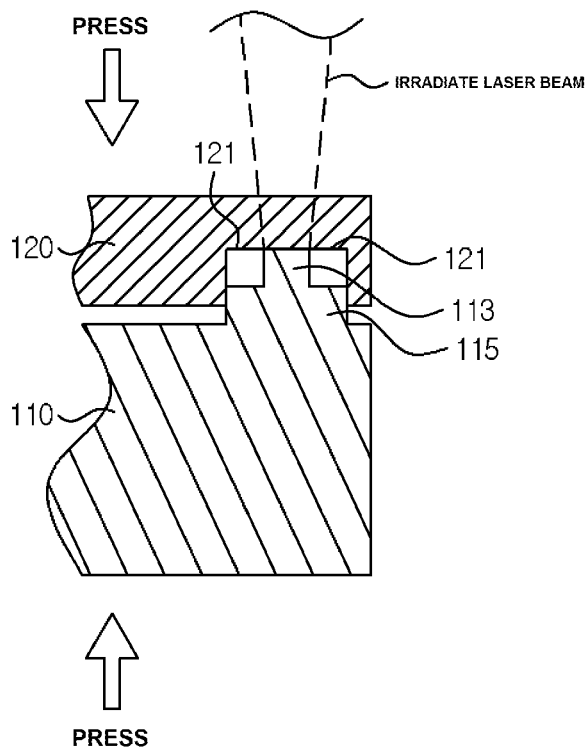
Figure 10:
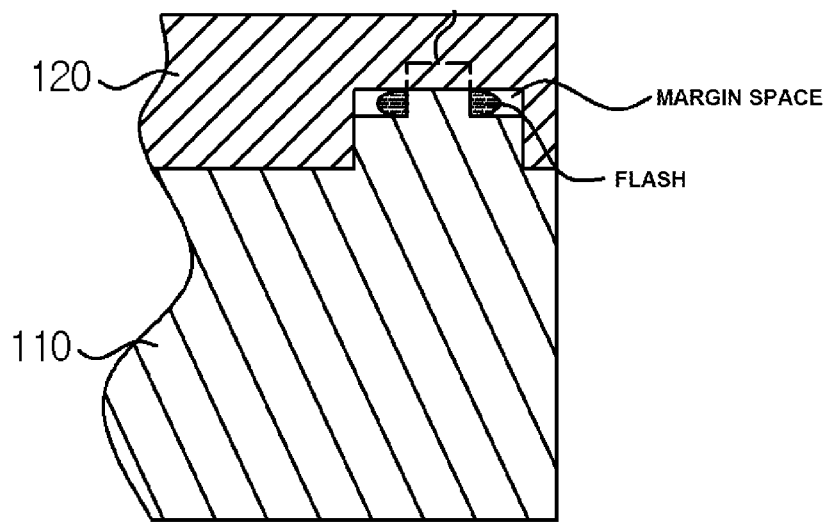

FIG. 6 is a cross-sectional view illustrating an end cell heater for a fuel cell according to a second exemplary embodiment of the present invention.

As illustrated, the end cell heater 1000 for a fuel cell according to a second exemplary embodiment of the present invention may be configured to include an end cell 100 including a body 110, an upper cover 120 stacked on and in contact with an upper surface of the body 110, and a lower cover 130 stacked on and in contact with a lower surface of the body 110, having air channels 111 formed between the body 110 and the upper cover 120, and having fuel channels 112 formed between the body 110 and the lower cover 130; a heating element 200 stacked on and coupled to the end cell 100; and an electricity collecting plate 300 stacked on and in contact with the heating element 200.

First, the end cell 100 may mainly consist of the body 110, the upper cover 120, and lower cover 130, and all of the body 110, the upper cover 120, and the lower cover 130 may be formed of, for example, a plastic plate. In addition, the upper cover 120 is stacked on the upper surface of the body 110, such that the body 110 and the upper cover 120 may be coupled or bonded to each other so that surfaces thereof facing each other are in contact with each other, and the lower cover 130 is stacked on the lower surface of the body 110, such that the body 110 and the lower cover 130 may be coupled or bonded to each other so that surfaces thereof facing each other are in contact with each other. In addition, the air channels 111 are formed between the body 110 and the upper cover 120, such that air may flow along the air channels 111, and the fuel channels 112 are formed between the body 110 and the lower cover 130, such that a fuel such as hydrogen, or the like, may flow along the fuel channels 112. In this case, the air channels 111 may be concavely formed in the upper surface of the body 110 or a lower surface of the upper cover 120. As an example, as illustrated, the air channels 111 may be concavely formed in the upper surface of the body 110, and opened upper sides of the air channels 111 may be closed by the upper cover 120 coupled or bonded to the upper surface of the body 110. In addition, the fuel channels 112 may be concavely formed in the lower surface of the body 110 or an upper surface of the lower cover 130. As an example, as illustrated, the fuel channels 112 may be concavely formed in the lower surface of the body 110, and opened lower sides of the fuel channels 112 may be closed by the lower cover 130 coupled or bonded to the lower surface of the body 110. In addition, the end cell 100 may be formed in various shapes such as a quadrangular shape having a length greater than a width, and the like, and may have air passages and fuel passages formed at both sides thereof in a length direction so as to penetrate through upper and lower surfaces thereof, the air passages may be connected to the air channels, and the fuel passages may be connected to the fuel channels. In addition, the end cell 100 may have a through-hole formed at a central side thereof so as to penetrate through the upper and lower surfaces thereof, and an electricity collecting terminal 310 formed on the electricity collecting plate 300 may be inserted into the through-hole so as to penetrate through the through-hole.

The heating element 200, which is a means capable of receiving electricity and generating heat, may be, for example, a film heater formed in a film shape, may be stacked on and coupled to the end cell 100, and be inserted into and seated in a seating groove concavely formed in a lower surface of the lower cover 130 of the end cell 100 as an example to be thus coupled and fixed to the end cell 100. In addition, the heating element 200 may also have a through-hole formed therein so as to penetrate through upper and lower surfaces thereof so that the electricity collecting terminal 310 of the electricity collecting plate 300 may penetrate therethrough and be inserted thereinto. In addition, a heat insulating sheet 400 may be interposed between the end cell 100 and the heating element 200, may prevent heat generated from the heating element 200 from being transferred to the end cell 100 formed of a plastic material, and may be formed of an electrical insulating material to perform an electrical insulating function.

The electricity collecting plate 300, which is a part capable of collecting and transferring electricity generated in a fuel cell stack, may be a metal plate formed of an electrically conductive material to be thus electrically conducted to the fuel cell stack. In addition, the electricity collecting plate 300 may be inserted into and seated in the seating groove formed in the lower cover 130 of the end cell 100, and may be stacked to closely adhere to and be in contact with the lower surface of the heating element 200 to be thus coupled to the end cell 100. In addition, the electricity collecting terminal 310 may be formed to protrude on an upper surface of the electricity collecting plate 300, and may be inserted and coupled into the through-holes of the end cell 100 and the heating element 200 so as to pass through the through-holes.

Therefore, the end cell heater for a fuel cell according to the present invention as described above is stacked on and is coupled to an outer side of the outermost reaction cell of the fuel cell stack so as to closely adhere to the outer side of the outermost reaction cell to thus prevent water in the reaction cell from being frozen, thereby making it possible to improve initial start ability and initial driving performance of the fuel cell.

In addition, fusing protrusions are formed to protrude on any one or more of the upper surface of the body 110 and the lower surface of the upper cover 120, fusing grooves are concavely formed at both sides of the fusing protrusions so as to be in contact with the fusing protrusions, and the fusing protrusions are melted, such that the body 110 and the upper cover 120 may be bonded to each other, and fusing protrusions are formed to protrude on any one or more of the lower surface of the body 110 and the upper surface of the lower cover 130, fusing grooves are concavely formed at both sides of the fusing protrusions so as to be in contact with the fusing protrusions, and the fusing protrusions are melted, such that the body 110 and the lower cover 130 may be bonded to each other.

That is, as an example, the fusing protrusions 113 may be formed to protrude on the upper surface and the lower surface of the body 110, the fusing grooves 114 may be concavely formed at both sides of the fusing protrusions 113 so as to be in contact with the fusing protrusions 113, and the lower surface of the upper cover 120 and the upper surface of the lower cover 130 may be flat surfaces. Here, a description will be provided on the basis of the fusing protrusions 113 and the fusing grooves 114 formed at an upper side of the body 110. The fusing protrusions 113 may be formed to protrude to be upwardly convex from the upper surface of the body 110, and the fusing grooves 114 may be formed adjacently to the fusing protrusions 113 at both sides of the fusing protrusions 113 so as to be downwardly concave from the upper surface of the body 110. Therefore, end portions of the fusing protrusions 113 are melted by fusion, such that the body 110 and the upper cover 120 may be bonded and coupled to each other, and a flash formed by melting and pressing the fusing protrusions 113 may be filled in the fusing grooves 114. Likewise, the body 110 and the lower cover 130 may be bonded and coupled to each other by fusion.

In addition, the fusing protrusions and the fusing grooves may be formed at both sides of each of the air channels 111 and the fuel channels 112 so as to be spaced apart from the air channels 111 and the fuel channels 112.

That is, the number of air channels 111 may be one or plural, the fusing protrusions 113 and the fusing grooves 114 may be formed along a path in which the air channels 111 are formed, and the fusing protrusions 113 and the fusing grooves 114 may be formed at both sides of the air channels 111 so as to be spaced apart from the air channels 111. Therefore, as illustrated, a pair of fusing protrusions 113 may be formed per air channel 111, one fusing protrusion 113 may be formed at each of both sides of one air channel 111, a pair of fusing grooves 114 may be formed per one fusing protrusion 113, and one fusing groove 114 may be formed at each of both sides of one fusing protrusion 113. In other words, protrusions and grooves of which one set is formed by the fusing grooves 114 formed at both sides of one fusing protrusion 113 may be formed at both sides of the channels, and one set of protrusions and grooves may be formed at both side of each of the channels. Therefore, the fusing protrusions are melted along the channels, such that contact surfaces are bonded to each other, thereby making it possible to secure air-tightness of each of the channels and secure pressure resistance properties of fluids flowing along the channels. Likewise, the number of fuel channels 112 may also be one or plural, the fusing protrusions 113 and the fusing grooves 114 may be formed along a path in which the fuel channels 112 are formed, and the fusing protrusions 113 and the fusing grooves 114 may be formed at both sides of the fuel channels 112 so as to be spaced apart from the fuel channels 112.

In addition, in the end cell 100, the fusing protrusions are melted by vibration fusion or laser fusion, such that the body 110 and the upper cover 120 may be bonded to each other and the body 110 and the lower cover 130 may be bonded to each other. As a result, the body 110, the upper cover 120, and the lower cover 130 may be formed integrally with one another.

That is, in a state in which the upper cover 120, the body 110, and the lower cover 130 are sequentially stacked and are pressed in a vertical direction so as to closely adhere to one another after the upper cover 120 is disposed on the body 110 and the lower cover 130 is disposed beneath the body 110 in a state in which the end portions of the fusing protrusions 113 are not melted, vibrations such as ultrasonic vibrations, or the like, are applied, such that heat is generated on a surface on which the fusing protrusions 113 formed at the upper side of the body 110 and the upper cover 120 are in contact with each other to melt the fusing protrusions 113, thereby making it possible to bond the body 110 and the upper cover 120 to each other. In addition, heat is generated on a surface on which the fusing protrusions 113 formed at a lower side of the body 110 and the lower cover 130 are in contact with each other to melt the fusing protrusions 113, thereby making it possible to bond the body 110 and the lower cover 130 to each other. In this case, the melted flash formed by melting the fusing protrusions 113 may be pushed into the fusing grooves 114. Therefore, the upper surface of the body 110 and the lower surface of the upper cover 120 may closely adhere and be bonded to each other, and the lower surface of the body 110 and the upper surface of the lower cover 130 may closely adhere and be bonded to each other. In this case, the melted flash may not be introduced between the upper surface of the body 110 and the lower surface of the upper cover 120 by the fusing grooves 114.

Alternatively, the body 110 is formed as an absorption layer capable of absorbing a laser beam, and the upper cover 120 and the lower cover 130 are formed as transmission layers through which the laser beam may transmit, such that the fusing protrusions 113 are melted and fused by the laser fusion, and the upper cover 120, the body 110, and the lower cover 130 may thus be formed integrally with one another.

That is, in a state in which the upper cover 120, the body 110, and the lower cover 130 are sequentially stacked and are pressed in a vertical direction so as to closely adhere to one another after the upper cover 120 is disposed on the body 110 and the lower cover 130 is disposed beneath the body 110 in the state in which the end portions of the fusing protrusions 113 are not melted, the laser beam is irradiated from above the upper cover 120 and below the lower cover 130 toward the fusing protrusions 113, thereby making it possible to bond portions at which the fusing protrusions 113 and the upper cover 120 are in contact with each other to each other and bond portions at which the fusing protrusions 113 and the lower cover 130 are in contact with each other to each other while melting the fusing protrusions 113. Here, the body 110 on which the fusing protrusions 113 are formed is formed to have a black color so that the laser beam may be absorbed therein, such that the body 110 may be formed as a laser absorption layer, and the upper cover 120 and the lower cover 130 are transparently formed so that the laser beam may pass therethrough, such that the upper cover 120 and the lower cover 130 may be formed of laser transmission layers. Therefore, the laser beam is irradiated from above the upper cover 120, and may pass through the upper cover 120 to allow the fusing protrusions 113 to be melted and fused and may pass through the lower cover 130 to allow the fusing protrusions 113 to be melted and fused. Also in this case, the melted flash formed by melting the fusing protrusions 113 may be pushed into the fusing grooves 114. Therefore, the upper surface of the body 110 and the lower surface of the upper cover 120 may closely adhere and be bonded to each other, and the lower surface of the body 110 and the upper surface of the lower cover 130 may closely adhere and be bonded to each other.

In addition, the seating groove is concavely formed in the lower surface of the lower cover 130, and the electricity collecting plate 300 is stacked on the lower surface of the heating element 200 so as to be in contact with the lower surface of the heating element 200, such that the heating element 200 and the electricity collecting plate 300 may be inserted into and seated in the seating groove.

That is, as described above, the heating element 200 and the electricity collecting plate 300 may be inserted into and seated in the seating groove concavely formed in the lower surface of the lower cover 130. In this case, the electricity collecting plate 300 is disposed beneath the heating element 200 so as to be in contact with the heating element 200, and the heat insulating sheet 400 may be interposed between a lower surface of the seating groove and the heating element 200, such that the heat insulating sheet 400 may be disposed on the heating element 200. In addition, a lower surface of the electricity collecting plate 300 may be formed to further protrude as compared with the lower surface of the lower cover 130 or coincide with the lower surface of the lower cover 130. Therefore, when the electricity collecting plate of the end cell heater for a fuel cell according to the present invention is coupled to the reaction cell of the fuel cell stack so as to closely adhere to the reaction cell, electrical insulation and air-tightness of the heating element 200 and the electricity collecting plate 300 may be easily maintained.

Contents to be described below may be applied to both of the first exemplary embodiment and the second exemplary embodiment of the present invention described above.

First, a cross-sectional area of a portion in which the fusing protrusion 113 is melted may be smaller than that of a pair of fusing grooves 114 formed at both sides of each fusing protrusion 113.

That is, as described above, the melted flash formed by melting the fusing protrusion 113 at the time of the fusion is pushed into the fusing grooves 114 formed at both sides of the fusing protrusion 113, and spaces of the pair of fusing grooves 114 are wider than an amount of flash, such that the flash is not pushed into a space between the upper surface of the body 110 and the lower surface of the upper cover 120 and is not pushed into a space between the lower surface of the body 110 and the upper surface of the lower cover 130. Therefore, the upper surface of the body 110 and the lower surface of the upper cover 120 may closely adhere to each other, and the lower surface of the body 110 and the upper surface of the lower cover 130 may closely adhere to each other.

In addition, protruding parts 115 are formed to protrude on the upper surface of the body 110, fusing protrusions 113 are formed to protrude on upper surfaces of the protruding parts 115, and insertion grooves 121 are concavely formed at positions corresponding to those of the protruding parts 115 in the upper cover 120, such that the protruding parts 115 and the fusing protrusions 113 may be inserted into the insertion grooves 121 and the fusing protrusions 113 may be melted to be fused to the insertion grooves 121.

That is, as illustrated in FIGS. 7 to 10, the protruding part 115 formed to protrude upwardly from the upper surface of the body 110 may be inserted and coupled into the insertion groove 121 concavely formed upwardly in the lower surface of the upper cover 120, such that the body 110 and the upper cover 120 may be bonded to each other in a state in which positions of the body 110 and the upper cover 120 in a horizontal direction are accurately fixed. In this case, the fusing protrusion 113 may be formed to protrude upwardly from the upper surface of the protruding part 115, have a width narrower than that of the protruding part 115, and be melted to be bonded to the insertion groove 121. In addition, the protruding part 115 and the insertion groove 121 may be formed at the outermost portion of the end cell 100 in the horizontal direction, and the protruding part 115 may be formed so that the fusing protrusion 113 and the fusing groove 114 of the body 110 are disposed at an inner side in the horizontal direction. In addition, protruding parts 115 and fusing protrusions 113, and insertion grooves 121 may also be formed in the body 110 and the lower cover 130, respectively, as in the coupled and bonded structure between the body 110 and the upper cover 120 described above.

In addition, a height of the insertion groove 121 is higher than that of the protruding part 115, and a cross-sectional area of a space between the protruding part 115 and the insertion groove 121 may be greater than that of a portion in which the fusing protrusion 113 is melted.

Figure 11:
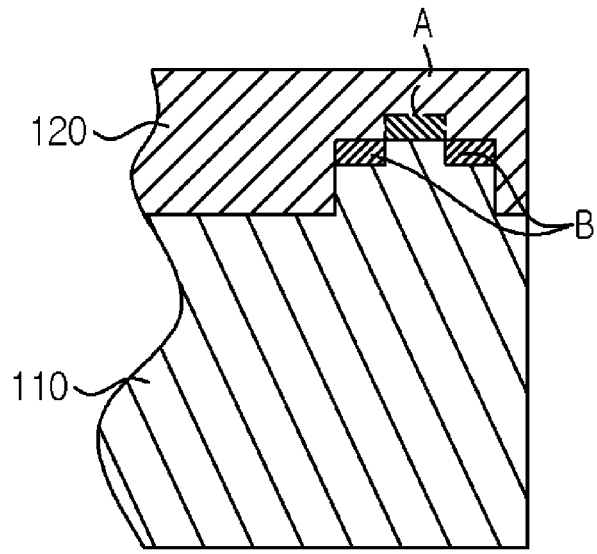
FIG. 11 is a cross-sectional view illustrating a relationship between a cross-sectional area of a portion in which a fusing protrusion is melted at the time of fusion and a cross-sectional area of a space in which a flash formed by melting the fusing protrusion may be filled.

That is, describing the body 110 and the upper cover 120 by way of example, in the case in which the fusing protrusion 113 is formed upwardly from the upper surface of the protruding part 115 of the body 110 as illustrated in FIGS. 7 to 10, the height of the insertion groove 121 is higher than that of the protruding part 115, such that the fusing protrusion is in a state in which it is maximally pressed when the upper surface of the body 110 and the lower surface of the upper cover 120 closely adhere to each other while the fusing protrusion is melted. In this case, the flash formed by melting the fusing protrusion is pushed into a space portion formed between the protruding part 115 and the insertion groove 121. For this reason, the space portion is formed to have a volume greater than an amount of fusing protrusion 113 that may be maximally melted. Here, the volume may be calculated by a cross-sectional area, and in the case in which the protruding part 115 and the insertion groove 121 are formed at the same width, a minimum cross-sectional area of the space portion, which is a value obtained by multiplying a difference between the width of the protruding part 115 and the width of the fusing protrusion 113 by a difference between the height of the insertion groove 121 and the height of the protruding part 115 may be designed to be greater than that of a portion in which the fusing protrusion may be maximally melted and pressed, which is a value obtained by multiplying a value obtained by subtracting the height of the insertion groove from the sum of the height of the protruding part and the height of the insertion groove by the width of the fusing protrusion. That is, as illustrated in FIG. 11, a cross-sectional area of part A may be smaller than the sum of cross-sectional areas of part B, which is both sides of the fusing protrusion 113. In addition, although not illustrated, insertion grooves may also be formed in the lower cover 130, and the protruding parts 115 may be inserted and coupled to the insertion groove.

In addition, a lead terminal 140 in which terminals 141 and injection-molded members 142 are formed integrally with each other by insert-injection-molding the terminals 141 is again insert-injection-molded, such that the body 110 and the lead terminal 140 may be formed integrally with each other.

Figure 12:
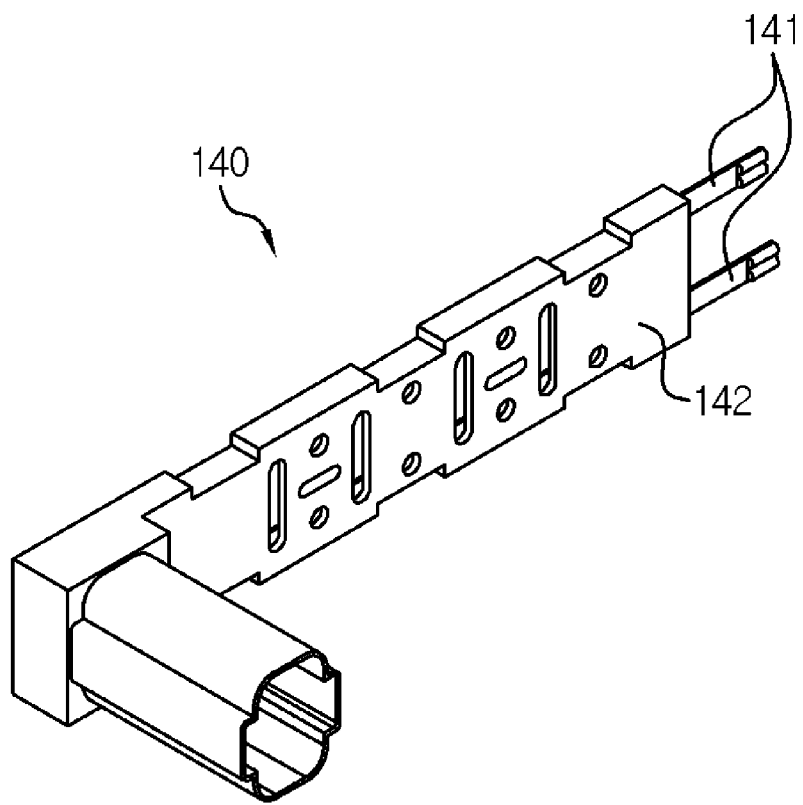
FIG. 12 is a perspective view illustrating a lead terminal according to the present invention.
Figure 13:
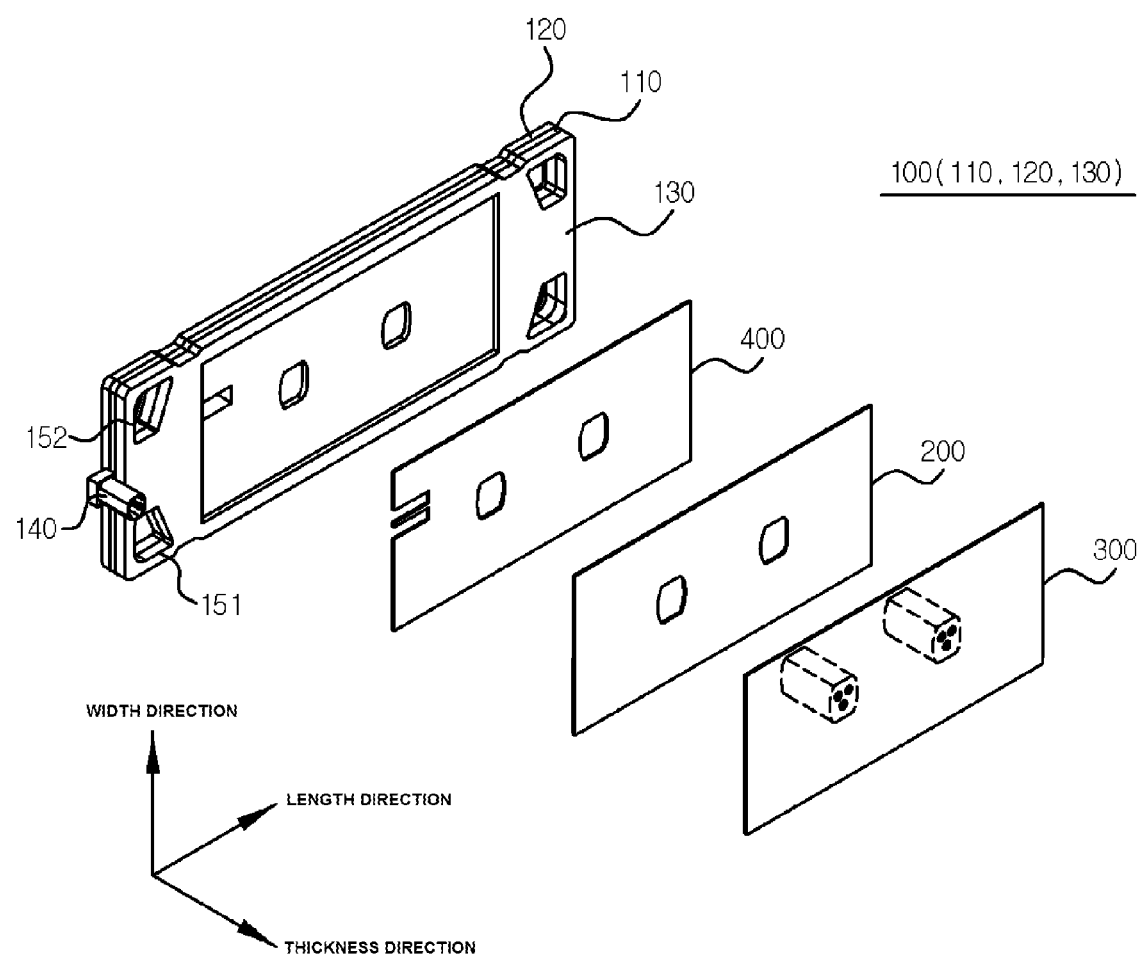
FIGS. 13 and 14 are, respectively, an exploded perspective view and an assembled perspective view illustrating the end cell heater for a fuel cell according to a second exemplary embodiment of the present invention.
Figure 14:
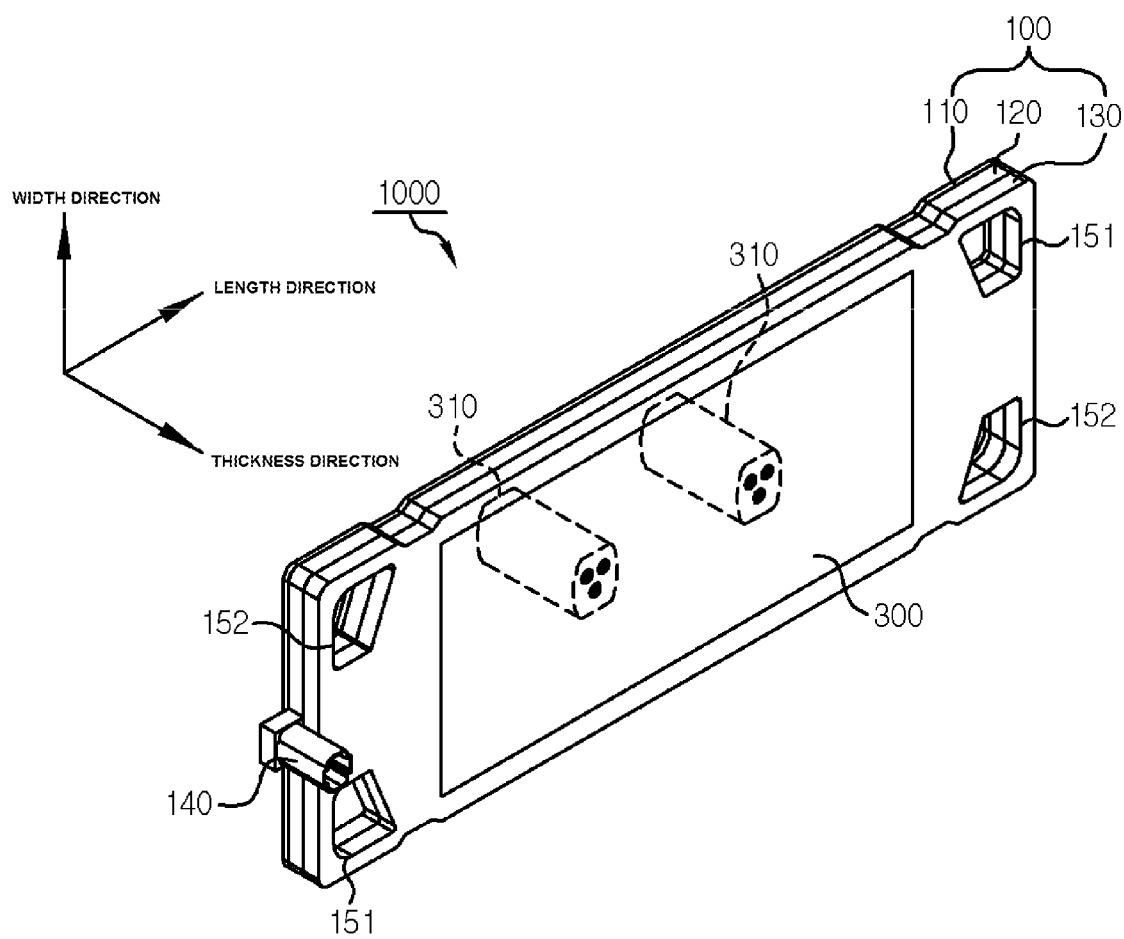

This is to allow the terminals 141 to be formed integrally with the body 110 when the body 110 is manufactured by injection-molding. Referring to FIGS. 12 and 14, after two terminals are disposed in parallel with each other so as to be spaced apart from each other and are fixed to an injection mold, primary injection-molding is performed, such that the terminals 141 are insert-injection-molded to be formed integrally with the injection-molded members 142, thereby making it possible to form an integral lead terminal 140. After the lead terminal 140 as described above is again fixed to the injection mold, secondary injection-molding is again performed, such that the lead terminal 140 may be insert-injection-molded to be formed integrally with the body 110.

In addition, the end cell heater 1000 for a fuel cell may be configured to further include an end plate 600 stacked on the upper cover 120 and a gasket 500 interposed between and closely adhering to the upper cover 120 and the end plate 600.

Figure 15:
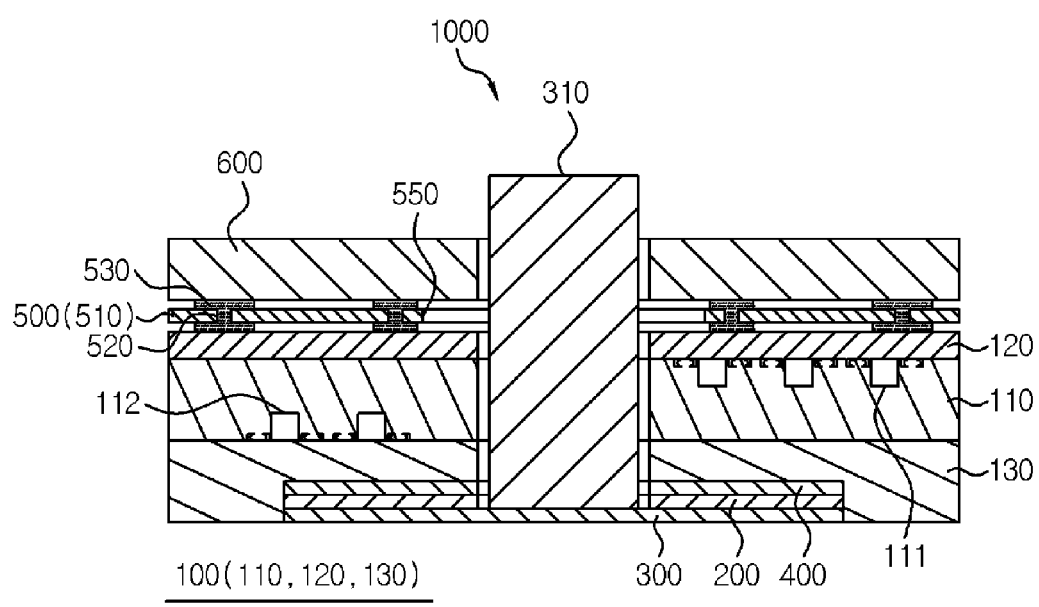
FIG. 15 is a cross-sectional view illustrating an example of a gasket and an end plate according to the present invention.
Figure 16:
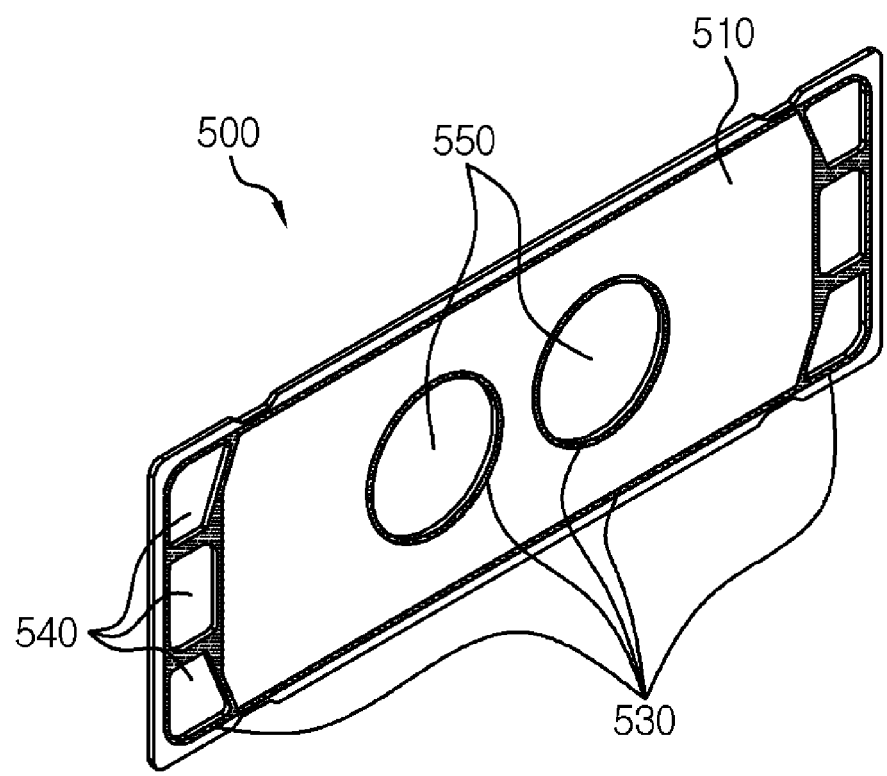
FIG. 16 is a perspective view illustrating the gasket of FIG. 15.

That is, referring to FIGS. 15 and 16, since the end cell 100 is formed of a plastic material, the end plate 600 formed of a metal may be coupled to one surface of the end cell 100 in order to increase mechanical rigidity. In this case, the gasket 500 may be interposed between and closely adhere to the end cell 100 and the end plate 600 in order to maintain air-tightness on a contact surface between the end cell 100 and the end plate 600.

Here, the gasket 500 includes sealing members 530 formed to protrude on both surfaces of a plate 510 and a plurality of communication holes 520 formed in the plate 510 so as to penetrate through upper and lower surfaces of the plate 510, and the sealing members 530 formed on the upper and lower surfaces of the plate 510 may be connected to each other through the communication holes 520.

That is, the gasket 500 may include the plate 510 and the sealing members 530 having a plate shape, and the sealing members 530 may be formed to protrude on both surfaces of the plate 510. In addition, the communication holes 520 penetrating through both surfaces of the plate 510 may be formed in the plate 510, and the sealing members 530 formed on both surfaces of the plate 510 may be connected to each other through the communication holes 520. Therefore, the sealing members 530 that are generally formed of a rubber or silicone material to have a difficulty in maintaining shapes are coupled and fixed to the plate 510, thereby making it possible to easily maintain shapes of the sealing member 530 and prevent moisture, foreign materials, and the like, from being introduced between the end plate 600 and the end cell 100.

In this case, seating grooves may be concavely formed along portions of both surfaces of the plate 510 on which the sealing members are formed so that portions of the sealing members may be inserted, and separation of the sealing members may thus be prevented. In addition, the end plate 600 may have a through-hole formed therein so that the electricity collecting terminal 310 may pass therethrough, and may have passages formed therein so as to be connected to the passages connected to the channels of the end cell 100. In addition, the gasket 500 may also have electricity collecting terminal holes 550 therein so that the electricity collecting terminal passes therethrough, and have passage holes 540 formed therein so as to be connected to the passages. In addition, a space between an outer peripheral surface of the electricity collecting terminal 310 penetrating through the end plate 600 and the through-hole of the end plate 600 is sealed by a sealant, or the like, thereby making it possible to prevent moisture, foreign materials, and the like, from being introduced toward the electricity collecting plate 300.

In addition, in the gasket 500, the plate 510 and the sealing members 530 may be formed integrally with each other by insert-injection-molding.

That is, after the plate 510 is formed of a metal, insert-injection-molding is performed, such that the gasket 500 may be easily formed in a form in which the sealing members 530 formed on both surfaces of the plate 510 are connected to each other through the communication holes 520 formed in the plate 510.

Figure 17:
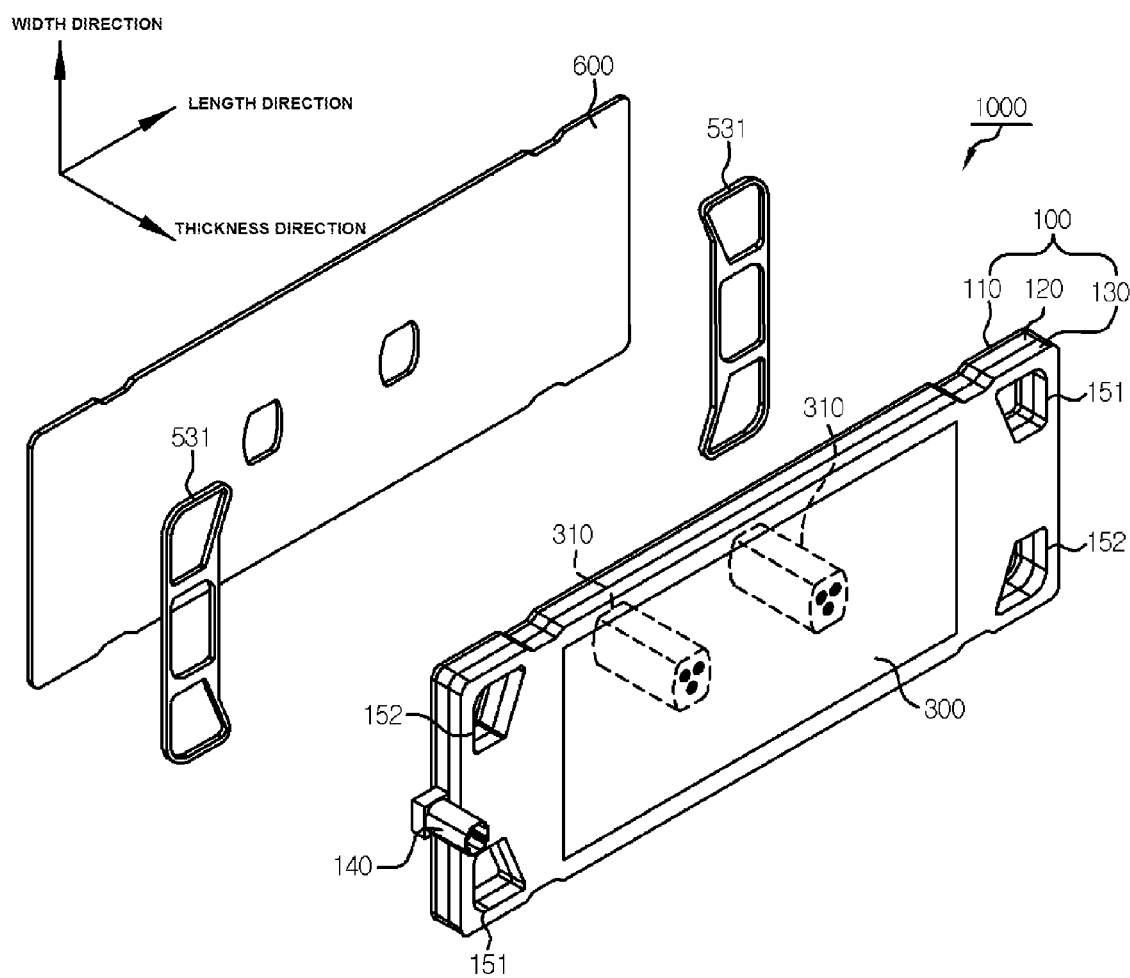
FIG. 17 is an exploded perspective view illustrating another example of a gasket according to the present invention.

In addition, as illustrated in FIG. 17, the gasket 500 may include only sealing members 530 formed of a rubber or silicone material without including the plate 510, and sealing members 531 may be disposed at both sides in the length direction to allow air-tightness of the air passages and the fuel passages formed in the end cell 110 to be maintained.

In addition, a thermal pad may be interposed between and closely adhere to the heating element 200 and the electricity collecting plate 300. That is, although not illustrated, the thermal pad is interposed between and closely adheres to the heating element 200 and the electricity collecting plate 300 so as to improve a thermal conduction function, thereby making it possible to allow the heat generated from the heating element 200 to be well transferred to a reaction cell 1100a of the fuel cell stack 1100 through the electricity collecting plate 300. In this case, the thermal pad may also have a through-hole formed therein so that the electricity collecting terminal 310 may penetrate therethrough.

In addition, a fuel cell 2000 including an end cell heater for a fuel cell according to the present invention may be configured to include a fuel cell stack 1100 formed by stacking unit cells and having air passages 1110 and fuel passages 1120 each formed at both sides thereof so as to penetrate through both surfaces thereof in a stack direction; and the end cell heaters 1000 coupled to the fuel cell stack 1100 and stacked on outer sides of unit cells stacked at the outermost portions among the unit cells, such that passages are connected to each other.

Figure 18:
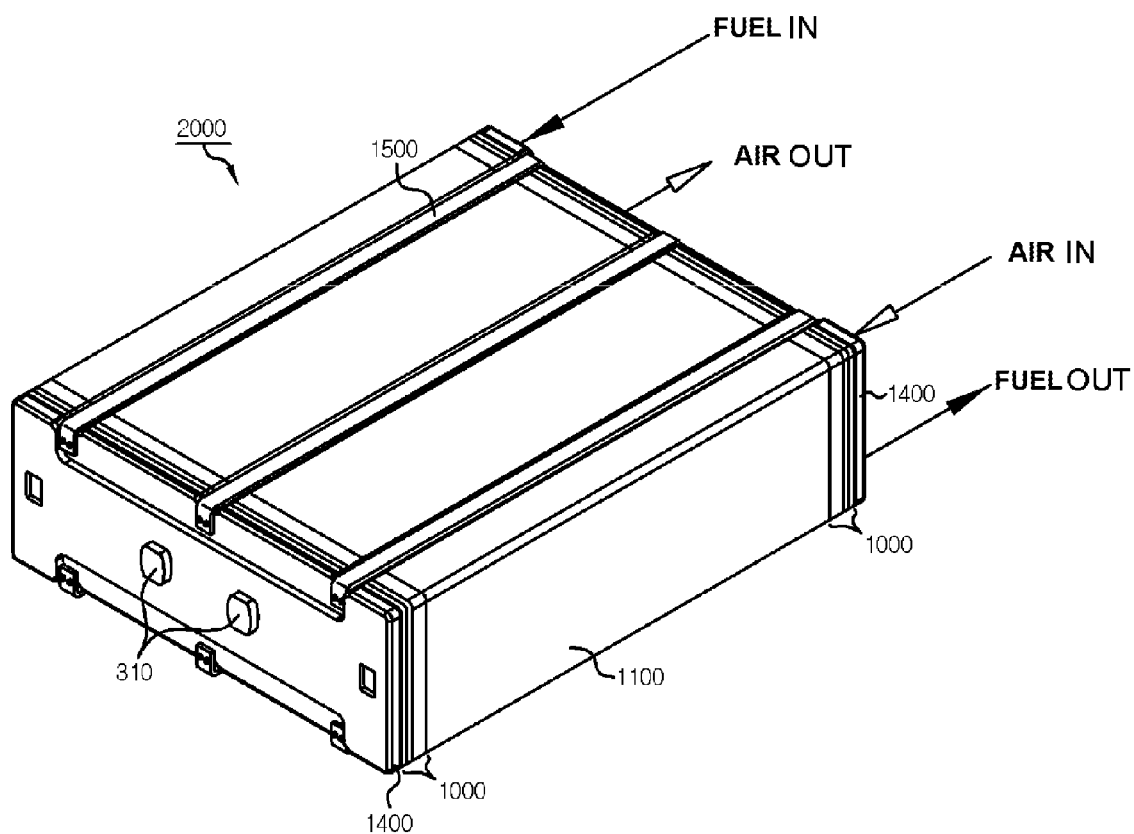
FIGS. 18 and 19 are, respectively, an assembled perspective view and an exploded perspective view illustrating a fuel cell including the end cell heater for a fuel cell according to the present invention.
Figure 19:
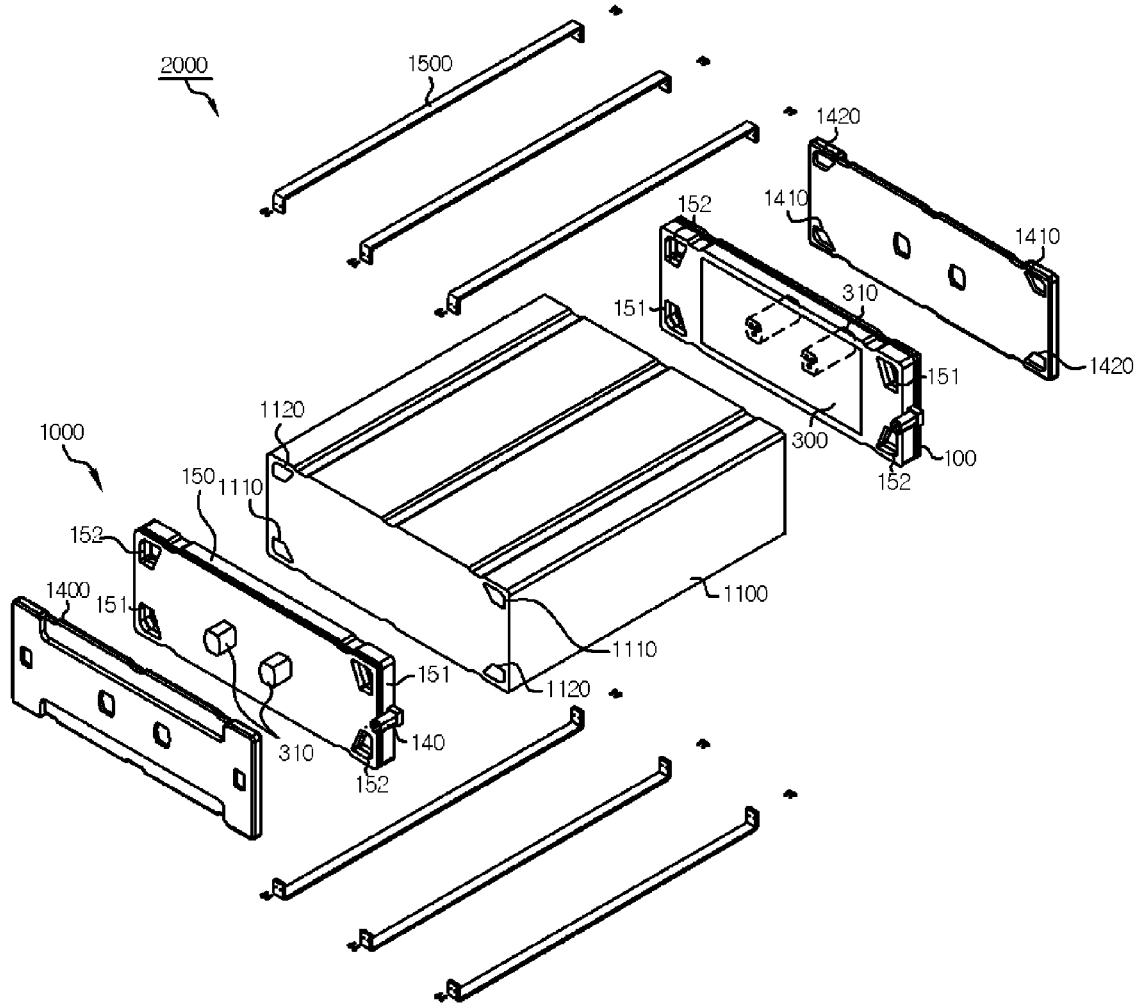

That is, the fuel cell 2000 may be formed by stacking the end cell heaters 1000 on the fuel cell stack 1100 formed by stacking the reaction cells 1100a, as illustrated in FIGS. 18 and 19, and the end cell heaters 1000 may be stacked on and closely adhere to the reaction cells 1100a stacked at the outermost portions of the fuel cell stack 1100, in the same direction as the stack direction. In this case, the air passages 1100 and the fuel passages 1120 formed in the fuel cell stack 1100 may be connected to air passages 151 and fuel passages 152 of the end cell heaters 1000 so as to correspond to the air passages 151 and the fuel passages 152 of the end cell heaters 1000. In this case, cooling passages are formed between the air passages 1110 and the fuel passages 1120 in the fuel cell stack 1100, such that a heat exchange medium (a refrigerant) may pass through the unit cells to cool the unit cells.

Therefore, the end cell heaters may be installed on the fuel cell stack only by stacking the end cell heaters on outer sides of the outermost reaction cells, like stacking the unit cells constituting the fuel cell stack, and coupling the end cell heaters to the outermost reaction cells so as to closely adhere to the outermost reaction cells, and a structure for connecting the passages to each other is simple, such that the end cell heaters may be very easily installed. In addition, it is possible to prevent water in the end cells of the fuel cell stack from being frozen using the end cell heaters as described above, such that initial start ability and initial driving performance of the fuel cell may be improved.

In addition, the end cell heaters 1000 according to the present invention may be disposed on both sides of the outermost portions of the fuel cell stack 1100. Here, the end cell heaters 1000 according to the second exemplary embodiment of the present invention in which both of the air channels and the fuel channels are formed may be disposed on both sides of the fuel cell stack 1100. Alternatively, the end cell heater 1000 according to the first exemplary embodiment of the present invention in which only the air channels are formed may be disposed on one side of the fuel cell stack 1100, and the end cell heater 1000 according to the second exemplary embodiment of the present invention in which both of the air channels and the fuel channels are formed may be disposed on the other side of the fuel cell stack 1100.

In addition, the fuel cell 2000 may be configured to further include covers 1400 stacked on outer sides of the end cell heaters 1000, having air passages 1410 and fuel passages 1420 formed at both sides thereof, respectively, so as to be connected to the air passages 151 and the fuel passages 152 of the end cell heaters 1000, respectively, formed to expose the electricity collecting terminals 131 of the end cell heaters 1000 to the outside thereof, and formed of an electrical insulating material; and fastening members 1500 having both ends coupled to the covers 1400 so that the fuel cell stack 1100, the end cell heaters 1000, and the covers 1400 closely adhere to one another in the stack direction.

That is, the covers 1400 formed of the electrical insulating material may be disposed on outer sides, in a thickness direction, of two end cell heaters 1000 disposed to be stacked, respectively, on both surfaces of the fuel cell stack 1100 in the thickness direction, and the two covers 1400, the two end cell heaters 1000, and the fuel cell stack 1100 may be coupled and fixed to one another so as to closely adhere to one another in the stack direction using the fastening members 1500. In this case, the covers 1400 may have through-holes formed therein so that the electricity collecting terminals 310 may be inserted thereinto and be exposed to the outside thereof. In addition, one of the two covers 1400 may have communication holes formed therein so as to be connected to the fuel passages and the air passages, and the other of the two covers 1400 may have communication holes formed therein so as to be connected to the cooling passages. In addition, the fastening members 1500 may be formed in a plate shape elongated in the thickness direction, and both ends of the fastening members 1500 may be bent in a width direction and be coupled and fixed to the covers 1400 by fastening means such as bolts.

The end cell heater for a fuel cell according to the present invention may prevent water in the reaction cell of the fuel cell stack from being frozen to improve the initial start ability and the initial driving performance of the fuel cell.

In addition, the air-tightness and the pressure resistance properties of the air passages and the fuel passages formed in the end cell may be secured by the vibration fusion and the laser fusion.

The present invention is not limited to the abovementioned exemplary embodiments, but may be variously applied. In addition, the present invention may be variously modified by those skilled in the art to which the present invention pertains without departing from the gist of the present invention claimed in the claims.

What is claimed is:
1. An end cell heater for a fuel cell, comprising:
   an end cell including a body, an upper cover stacked on and in contact with an upper surface of the body, and a lower cover stacked on and in contact with a lower surface of the body, having air channels formed between the body and the upper cover, and having fuel channels formed between the body and the lower cover;
   a heating element stacked on and coupled to the end cell;
   an electricity collecting plate stacked on and in contact with the heating element; and
   a seating groove concavely formed in a lower surface of the lower cover;
   wherein the electricity collecting plate is stacked on a surface of the heating element so as to be in contact with the lower surface of the heating element, such that the heating element and the electricity collecting plate are inserted into and seated in the seating groove.

2. The end cell heater for a fuel cell of claim 1, wherein fusing protrusions are formed to protrude on any one or more of the upper surface of the body and a lower surface of the upper cover, fusing grooves are concavely formed at both sides of the fusing protrusions so as to be in contact with the fusing protrusions, and the fusing protrusions are melted, such that the body and the upper cover are bonded to each other, and
   the fusing protrusions are formed to protrude on any one or more of the lower surface of the body and an upper surface of the lower cover, fusing grooves are concavely formed at both sides of the fusing protrusions so as to be in contact with the fusing protrusions, and the fusing protrusions are melted, such that the body and the lower cover are bonded to each other.

3. The end cell heater for a fuel cell of claim 1, wherein the fusing protrusions and the fusing grooves are formed at both sides of each of the air channels and the fuel channels so as to be spaced apart from the air channels and the fuel channels.

4. The end cell heater for a fuel cell of claim 1, wherein in the end cell, fusing protrusions are melted by vibration fusion or laser fusion, such that the body and the upper cover are bonded to each other and the body and the lower cover are bonded to each other, and the body, the upper cover, and the lower cover are thus formed integrally with one another.

5. The end cell heater for a fuel cell of claim 1, wherein a cross-sectional area of a portion in which a fusing protrusion is melted is smaller than that of a pair of fusing grooves formed at both sides of each fusing protrusion.

6. The end cell heater for a fuel cell of claim 1, wherein protruding parts are formed to protrude on the upper surface of the body, fusing protrusions are formed to protrude on upper surfaces of the protruding parts, and insertion grooves are concavely formed at positions corresponding to those of the protruding parts in the upper cover, such that the protruding parts and the fusing protrusions are inserted into the insertion grooves and the fusing protrusions are melted to be fused to the insertion grooves.

7. The end cell heater for a fuel cell of claim 6, wherein a height of the insertion groove is higher than that of the protruding part, and a cross-sectional area of a space between the protruding part and the insertion groove is greater than that of a portion in which the fusing protrusion is melted.

8. The end cell heater for a fuel cell of claim 1, wherein a lead terminal in which terminals and injection-molded members are formed integrally with each other by insert-injection-molding, the terminals is again insert-injection-molded, such that the body and the lead terminal are formed integrally with each other.

9. The end cell heater for a fuel cell of claim 1, further comprising:
an end plate stacked on the upper cover; and
a gasket interposed between and closely adhering to the upper cover and the end plate.

10. The end cell heater for a fuel cell of claim 9, wherein the gasket includes sealing members formed to protrude on both surfaces of a plate and a plurality of communication holes formed in the plate so as to penetrate through upper and lower surfaces of the plate, and
the sealing members formed on the upper and lower surfaces of the plate are connected to each other through the communication holes.

11. The end cell heater for a fuel cell of claim 10, wherein in the gasket, the plate and the sealing members are formed integrally with each other by insert-injection-molding.

12. A fuel cell stack, comprising:
end cells disposed at both ends of the fuel cell stack;
each of the end cells including a body, an upper cover stacked on and in contact with an upper surface of the body, and a lower cover stacked on and in contact with a lower surface of the body, having air channels formed between the body and the upper cover, and having fuel channels formed between the body and the lower cover;
a heating element stacked on and coupled to the end cell; and
an electricity collecting plate stacked on and in contact with the heating element,
a heat insulating sheet interposed between the end cell and the heating element to prevent heat generated from the heating element from being transferred to the end cell.

* * * * *